(12) United States Patent
Kwon

(10) Patent No.: US 7,594,251 B2
(45) Date of Patent: Sep. 22, 2009

(54) APPARATUS AND METHOD OF MANAGING RECEPTION STATE OF DATA IN DIGITAL BROADCASTING SYSTEM

(75) Inventor: Hung-Rok Kwon, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 904 days.

(21) Appl. No.: 11/009,715

(22) Filed: Dec. 13, 2004

(65) Prior Publication Data
US 2006/0031905 A1    Feb. 9, 2006

(30) Foreign Application Priority Data
Aug. 9, 2004    (KR) ............... 10-2004-0062638

(51) Int. Cl.
H04N 7/173    (2006.01)
H04N 7/16    (2006.01)

(52) U.S. Cl. ............ 725/107; 725/109; 725/111; 725/114; 725/117; 725/131; 725/25

(58) Field of Classification Search ........... 725/1–153; 348/192–193; 714/43, 48
See application file for complete search history.

(56) References Cited

U.S. PATENT DOCUMENTS

| | | | |
|---|---|---|---|
| 5,874,992 A * | 2/1999 | Caporizzo ............ | 348/192 |
| 6,002,422 A * | 12/1999 | Mastenbrook ......... | 725/107 |
| 6,018,300 A * | 1/2000 | Dowden et al. ........ | 340/635 |
| 6,266,813 B1 | 7/2001 | Ihara | |
| 6,373,904 B1 | 4/2002 | Sakamoto et al. | |
| 6,556,659 B1 | 4/2003 | Bowman-Amuah | |
| 6,563,515 B1 * | 5/2003 | Reynolds et al. ....... | 715/721 |
| 6,598,229 B2 * | 7/2003 | Smyth et al. .......... | 725/107 |
| 6,738,103 B2 | 5/2004 | Kato | |
| 6,748,432 B1 * | 6/2004 | Du et al. .............. | 709/224 |
| 6,782,884 B1 * | 8/2004 | Chen et al. ........... | 725/111 |
| 6,906,743 B1 * | 6/2005 | Maurer ................ | 348/180 |
| 7,116,685 B2 * | 10/2006 | Brown et al. .......... | 370/485 |
| 2001/0011375 A1 * | 8/2001 | Yun .................... | 725/107 |

(Continued)

FOREIGN PATENT DOCUMENTS

JP    09-289509    11/1997

(Continued)

OTHER PUBLICATIONS

UK Search Report corresponding to UK Patent Application No. GB0515107.1, issued on Oct. 31, 2005.

(Continued)

Primary Examiner—John W Miller
Assistant Examiner—Christopher S McGahey
(74) Attorney, Agent, or Firm—Robert E. Bushnell, Esq.

(57) ABSTRACT

An apparatus and method of managing a reception state of data in a digital broadcasting system has monitoring functions of a cable network, a broadcasting channel and received data realized for a set-top box as a digital broadcasting receiver of the digital broadcasting system, and a notification message depending on generated reception error of the data is transmitted to a head end, thereby efficiently managing data transmission of the cable network, the broadcasting channel and each server of the head end.

28 Claims, 14 Drawing Sheets

U.S. PATENT DOCUMENTS

| | | |
|---|---|---|
| 2002/0001357 A1 | 1/2002 | Ohsawa |
| 2002/0075824 A1 | 6/2002 | Willekes et al. |
| 2003/0136135 A1* | 7/2003 | Kim et al. .................... 62/125 |
| 2003/0200548 A1* | 10/2003 | Baran et al. ................... 725/90 |
| 2004/0103442 A1* | 5/2004 | Eng .......................... 725/126 |
| 2005/0183130 A1* | 8/2005 | Sadja et al. ................. 725/107 |
| 2005/0204397 A1* | 9/2005 | Miyazoe et al. ............ 725/107 |

FOREIGN PATENT DOCUMENTS

| | | | |
|---|---|---|---|
| JP | 11-017810 | | 1/1999 |
| JP | 11017810 A | * | 1/1999 |
| JP | 2001-144654 | | 5/2001 |
| JP | 2002-14880 | | 1/2002 |
| JP | 2003-046973 | | 2/2003 |
| JP | 2003-333627 | | 11/2003 |

OTHER PUBLICATIONS

Office Action from the Japanese Patent Office issued in Applicant's corresponding Japanese Patent Application No. 2005-226355 dated Apr. 8, 2008.

* cited by examiner

FIG. 5

ERROR NOTIFICATION FUNCTION MENU

| | | |
|---|---|---|
| a { ☐ NOTIFICATION FUNCTION ENABLE | [Yes/No] | |
| b { ☐ MONITOR SERVER IP ADDRESS | [10.10.10.91] | |
| ☐ MONITOR SERVER TELEPHONE NUMBER | [080-1234] | |
| c { ☐ INSTALLATION AREA CODE | [12] | Error-code 00 |
| d { ☐ NORMAL STATE REPORT CYCLE TIME | [Yes/No] | Error-code 01 |
| ☐ MODEM NO LOCKING REPORT | [Yes/No] | Error-code 02 |
| e { ☐ MODEM OUT OF POWER RANGE REPORT | [Yes/No] | Error-code 03 |
| ☐ MODEM POOR SNR REPORT | [Yes/No] | Error-code 11 |
| ☐ BROADCASTING CHANNEL NO LOCKING REPORT | [Yes/No] | Error-code 12 |
| f { ☐ BROADCASTING CHANNEL OUT OF POWER RANGE REPORT | [Yes/No] | Error-code 13 |
| ☐ BROADCASTING CHANNEL POOR SNR REPORT | [Yes/No] | Error-code 21 |
| g { ☐ SL DATA NON-RECEPTION REPORT | [Yes/No] | Error-code 22 |
| ☐ CA DATA NON-RECEPTION REPORT | [Yes/No] | Error-code 23 |

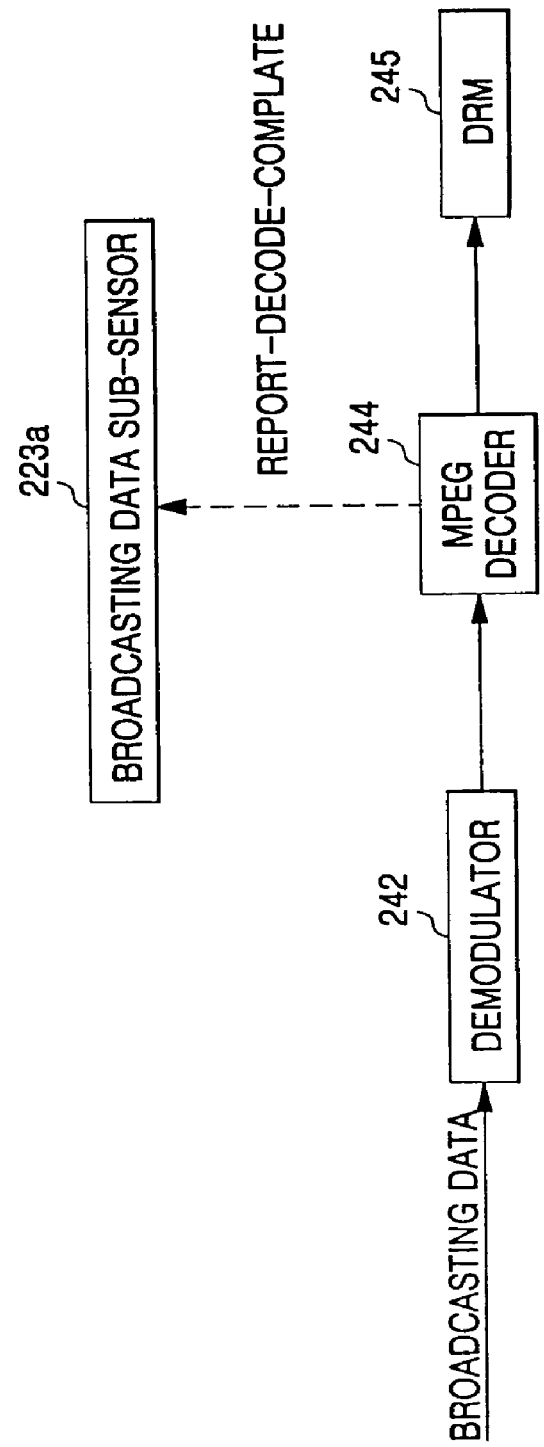

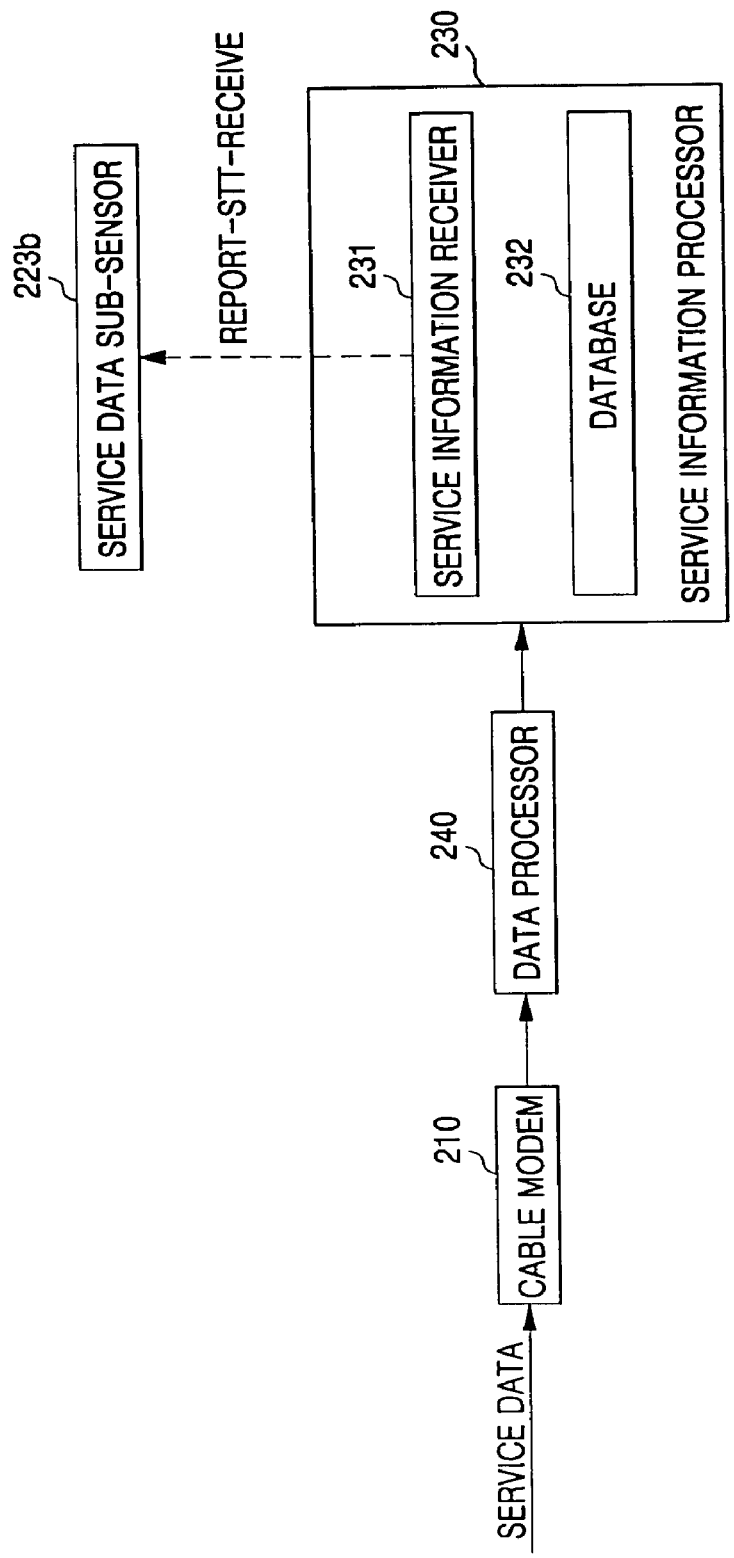

APPARATUS AND METHOD OF MANAGING RECEPTION STATE OF DATA IN DIGITAL BROADCASTING SYSTEM

CLAIM OF PRIORITY

This application makes reference to, incorporates the same herein, and claims all benefits accruing under 35 U.S.C. §119 from an application for APPARATUS AND METHOD OF MANAGING RECEPTION STATE OF DATA IN DIGITAL BROADCASTING SYSTEM earlier filed in the Korean Intellectual Property Office on 9 Aug. 2004 and there duly assigned Ser. No. 2004-62638.

BACKGROUND OF THE INVENTION

1. Field of the Invention

The present invention relates to a digital broadcasting system. More particularly, the present invention relates to an apparatus and method of managing a reception state of data in a digital broadcasting system, in which a set-top box in the digital broadcasting system monitors states of a cable network, a broadcasting channel and received data and, in the mean time, when an abnormal state or an error of the received data is generated, transmits a notification message depending on the error to a head end.

2. Description of the Related Art

Such a digital broadcasting system has been used for digital terrestrial broadcasting, digital satellite broadcasting, cable digital broadcasting, etc. according to transmission media of broadcasting data.

These digital broadcasting services compress program information of each channel in conformance to MPEG (Moving Picture Experts Group) coding standards, and multiplex and transmit programs corresponding to a plurality of channels on the basis of a digital modulation scheme of each transmission medium. Thus, digital broadcasting data can transmit program information through tens to hundreds of channels without using many repeaters, like analog broadcasting signals.

In general, the digital broadcasting system for promoting the cable digital broadcasting services is composed of a head end for transmitting digital broadcasting data related to broadcasting and for processing data uploaded from a subscriber, and a set-top box, as a digital broadcasting receiver, for converting the digital broadcasting data transmitted from the head end into broadcasting signals, for restoring the converted signals to original video and audio signals and for providing the restored signals to a digital television (TV).

The head end refers to a main control center equipped with technical installations capable of receiving, preparing and re-transmitting the program information in the digital broadcasting system. The set-top box refers to a home communication terminal for providing bidirectional multimedia communication services to the subscriber like video on demand (VOD) services.

For the cable digital broadcasting system, compression technology of audio and video data employs a MPEG-2 (Moving Picture Experts Group-2) protocol, and amplitudes and phases of signals are modulated according to a QAM (Quadrature Amplitude Modulation) scheme as one of digital modulation schemes.

The set-top box, a digital broadcasting receiver, in the digital broadcasting system is mainly directed to decoding of digitalized broadcasting data, management data and control data transmitted from the head end and provision the analyzed result to the digital TV.

Specifically, the set-top box receives/manages each of the data transmitted from a digital broadcasting server or an audio/video server, a service information server and conditional access server which constitutes the head end, wherein the service information server transmits broadcasting channel information and the conditional access server provides information on the subscriber and key information capable of decoding encoded broadcasting data. In the meantime, the set-top box converts the broadcasting data into broadcasting signals according to a request of the subscriber, and provides the converted signals to the digital TV.

FIG. 1 is an entire block diagram for explaining network connection of a general digital broadcasting system.

Referring to FIG. 1, the digital broadcasting system includes ahead end 10, a CMTS (Cable Modem Termination System) 30, a set-top box or a digital broadcasting receiver 20, and a digital TV 40. The head end 10 includes a service information server 11, a conditional access server 12 and a digital broadcasting server 13.

The set-top box 20 includes a cable modem 21, a data processor 22, and a conditional access processor 23.

The service information server 11 of the head end 10 provides service information for providing digital broadcasting services.

These service data provided at the service information server 11 may include program information such as program identifier (PID) and event information which are provided at the digital broadcasting server 13.

Further, the service information server 11 transmits the service data to the CMTS 30 on the basis of an Internet protocol (IP) network.

The digital broadcasting server 13 provides broadcasting data in which video and audio data of programs received or prepared at the head end 10 are included.

At this time, the digital broadcasting server 13 can compress the broadcasting data in conformance to MPEG coding standards, encipher the broadcasting data for preventing malicious application, and transmit the enciphered broadcasting data.

The digital broadcasting server 13 transmits the broadcasting data to the set-top box 20 through the broadcasting channels of the cable network.

The conditional access server 12 manages various information, such as key information capable of decoding the enciphered broadcasting data, information on authority of a subscriber to watch each program, purchase history information on the subscriber, etc., and simultaneously provides the conditional access data, in which the key information and the authority information are included, to the set-top box.

In this case, the conditional access server 12 can transmit the conditional access data to the set-top box 20 through the CMTS 30 either in an EMM (Entitle Management Message) form or in an ECM (Entitle Control Message) form.

The CMTS 30 converts data of IP packet format, which are received from the service information server 11 and the conditional access server 12 through the IP network, into cable data for transmitting the data of IP packet format to the set-top box 20.

The set-top box 20 converts broadcasting data into broadcasting signals and transmits the converted signals to the digital TV 40, wherein the broadcasting data are received through the corresponding broadcasting channels depending on channel selection of the subscriber.

Specifically, the cable modem 21 of the set-top box 20 receives the service data which are converted into the cable data at the CMTS 30, transmits the received data to the conditional access processor 23, and transmits the broadcasting data to the data processor 22.

The conditional access processor 23 manages the key information and the program-specific watching authority information of the subscriber based on the conditional access data provided from the conditional access server 12. In the meantime, when the subscriber selects a channel, the conditional access processor 23 checks whether the subscriber has authority to watch the selected channel or not. When the subscriber has the watching authority, the conditional access processor 23 decodes the encoded broadcasting databased on the key information.

The data processor 22 decompresses the broadcasting data which are compressed according to the MPEG coding scheme, and converts the decompressed data into the broadcasting signals. Then, the data processor 22 transmits the broadcasting signals to the digital TV 40 in order to provide the digital broadcasting services to the subscriber.

This method of providing the digital broadcasting services of the digital broadcasting system will be described in brief.

The service information server 11 transmits service data, in which program information and event information are included, to the set-top box 20. The conditional access server 12 transmits both key information and watching authority information of the subscriber to the set-top box 20.

The digital broadcasting server 13 transmits broadcasting data, in which audio data and video data are included, to the set-top box 20.

When a subscriber selects the program information, the set-top box 20 obtains channel information of the selected program information, and checks whether the subscriber has authority to watch the selected program information or not.

Meanwhile, when the subscriber has the authority to watch the selected program information, the set-top box 20 detects frequency information to receive the broadcasting data according to the obtained channel information, and then receives the broadcasting data through the detected frequency information.

The set-top box 20 decodes the received broadcasting data using the key information, decompresses the decoded data according to the MPEG coding scheme, and then converts the decompressed data into broadcasting signals.

Then, the set-top box 20 transmits the converted broadcasting signals to the digital TV 40.

However, the general digital broadcasting system takes a manually operated system where the set-top box 20, as the digital broadcasting receiver, processes the broadcasting data provided at the digital broadcasting server 13 into the broadcasting signals and transmits the processed signals to the digital TV 40.

Therefore, for the digital broadcasting system, when an error is generated either from any one of the servers 11, 12 and 13 of the head end 10 or from any one of the cable network and the broadcasting channel, the set-top box 20 fails to receive any one of the broadcasting data, the service data and the conditional access data. For this reason, the digital broadcasting system is confronted with a broadcasting mishap that cannot provide the digital broadcasting services to the subscriber.

SUMMARY OF THE INVENTION

Therefore, the present invention is to provide an apparatus and method of managing a reception state of data in a digital broadcasting system, in which a set-top box of the digital broadcasting system monitors situations of a cable network, a broadcasting channel and data and, in the mean time, when an error of the received data is generated, transmits a notification message depending on a type of the error to a head end, and when the notification message is received, the head end causes the error to be checked, thereby improving management efficiency both to each server of the head end and to the cable network.

It is another object to provide monitoring functions of the cable network, the broadcasting channel and received data are realized for the set-top box, as the digital broadcasting receiver, of the digital broadcasting system that is easy to implement and cost effective.

In order to accomplish this objective, a digital broadcasting system according to an aspect of the invention includes: a service-providing server providing data for providing digital broadcasting services; and a digital broadcasting receiver monitoring a state of the data received through a network connected with the service-providing server, and when an error is generated on the received data, transmitting an notification message including intrinsic information on each error to the service-providing server. The service-providing server generates and outputs an alarm message according to the intrinsic information on each error included in the notification message received from the digital broadcasting receiver.

The service-providing server of the digital broadcasting system according to the invention includes a first server providing service data including program information and event information provided to the digital broadcasting system, a second server encoding, compressing and providing broadcasting data including video data and audio data, a third server providing conditional access data including key information capable of decoding the encoded broadcasting data and information on authority of a subscriber to watch each program, and a fourth server outputting the alarm message according to the intrinsic information on each error included in the notification message received from the digital broadcasting receiver.

Further, the digital broadcasting system according to the invention further includes a CMTS (Cable Modem Termination System) converting data of an Internet protocol (IP) packet format received through an IP network into those capable of being transmitted through a cable network, and converting the notification message into that of the IP packet format capable of being transmitted to the fourth server.

In addition, the digital broadcasting receiver of the digital broadcasting system according to the invention includes a cable modem receiving the data converted at the CMTS and transmitting the generated notification message to the fourth server through the CMTS; a service information processor storing the service data transmitted from the first server and generating a service data report signal, and when the conditional access data are received from the third server, generating a first conditional access data report signal; a data processor decompressing the broadcasting data transmitted from the second server, converting the decompressed broadcasting data into broadcasting signals and generating a broadcasting data report signal, and when the conditional access data are received from the third server, generating a second conditional access data report signal; and an error sensor monitoring at least one of a generation state of each generated report signal and a reception state of the data received through the network, generating the notification message including the intrinsic information according to the generated errors, and transmitting the generated notification message to the fourth server.

Moreover, the data processor of the digital broadcasting system according to the invention includes a sniffer for generating the second conditional access data report signal when the conditional access data of an ECM (Entitle Control Message) format sniffed from the third server and transmitting the generated second conditional access data report signal to the error sensor.

The error sensor of the digital broadcasting system according to the invention includes: a sensing information setter setting intrinsic information on each type of the errors generated in the digital broadcasting system; a sub-sensor finding out information on types of the errors according to a generation state of each report signal and a reception state of the data received through the network, and generating the notification message including the intrinsic information according to the error; and a message transmitter transmitting the notification message generated at the sub-sensor to the fourth server through the cable modem.

Further, the sub-sensor of the digital broadcasting system according to the invention includes at least one of a network sub-sensor generating a network notification message when the data received from each server have a received power level beyond a predetermined range or a value of SNR (Signal to Noise Ratio) exceeding a predetermined value, a service data sub-sensor generating a service data notification message when the service data report signal is not received from the service information processor at a predetermined cycle time, a conditional access data sub-sensor generating a conditional access data notification message when any one of the first conditional access data report signal received from the service information processor and the second conditional access data report signal received from a sniffer is not received at a predetermined cycle time, and a broadcasting data sub-sensor generating a broadcasting data notification message when the broadcasting data report signal is not received from the data processor by a predetermined number of times within a predetermined time.

In addition, the error sensor of the digital broadcasting system according to the invention further includes a sensing controller preventing each data notification message from being generated for a predetermined time when a network notification message is generated at the network sub-sensor.

Meanwhile, according to another aspect of the invention, there is provided a digital broadcasting receiver of a digital broadcasting system having a service information server, a conditional access server, a digital broadcasting server and a management server. The digital broadcasting receiver includes a service information processor generating a service data report signal when service data including program information transmitted from the service information server are received, and generating an EMM (Entitle Management Message) conditional access data report signal when conditional access data are received from the conditional access server in an EMM format; a data processor generating a broadcasting data report signal when broadcasting data are received from the digital broadcasting server, and generating an ECM (Entitle Control Message) conditional access data report signal when the conditional access data are received from the conditional access server in an ECM format; and an error sensor monitoring any one selected from errors of each server and an error of a network according to a generation state of each report signal, generating notification messages including intrinsic information on each error when the error is generated, and transmitting the generated notification messages to the management server.

At the digital broadcasting receiver of the digital broadcasting system, the data processor includes a decoder decompressing the broadcasting data transmitted from the digital broadcasting server according to an MPEG coding scheme and generating the broadcasting data report signal, and a sniffer sniffing the conditional access data transmitted from the conditional access server in the ECM format and generating the ECM conditional access data report signal.

In addition, the error sensor of the digital broadcasting receiver of the digital broadcasting system includes at least one of a network sub-sensor generating a network notification message when the respective data received through the network have a received power level beyond a predetermined range or a value of SNR (Signal to Noise Ratio) exceeding a predetermined value, a service data sub-sensor generating a service data notification message when the service data report signal is not received from the service information processor at a predetermined cycle time, a broadcasting data sub-sensor generating a broadcasting data notification message when the broadcasting data report signal is not received from the decoder by a predetermined number of times within a predetermined time, and a conditional access data sub-sensor generating a conditional access data notification message when any one of the EMM conditional access data report signal generated at the service information processor and the ECM conditional access data report signal generated at a sniffer is not received at a predetermined cycle time.

The digital broadcasting receiver of the digital broadcasting system according to the invention further includes a sensing controller interrupting monitoring functions of each data sub-sensor for a predetermined time when the network notification message is generated at the network sub-sensor, and a message transmitter transmitting each notification message to the management server through the network.

According to yet another aspect of the invention, there is provided a method of managing a reception state of data in a digital broadcasting system. The method includes setting sensing information including intrinsic information on each error; monitoring the reception state of the data transmitted from a service-providing server; finding out types of the errors according to the data reception state, generating notification messages including the intrinsic information on each error, and transmitting the generated notification messages to the service-providing server; and outputting, at the service-providing server, alarm messages according to the notification messages so that a manager can recognize the notification messages.

In the method of managing the reception state of the data in the digital broadcasting system, monitoring the reception state of the data includes at least one of: checking whether the data received through a network have a received power level beyond a predetermined range or have a value of SNR (Signal to Noise Ratio) exceeding a predetermined value or not; determining whether broadcasting data received through the network are received by predetermined frames for a predetermined time or not; determining whether service data including program information are received at a predetermined cycle time or not; and determining whether conditional access data including key information and information on authority of a subscriber to watch each program are periodically received or not.

In the method of managing the reception state of the data in the digital broadcasting system, generating the notification messages includes at least one of: generating a network notification message when the data have a received power level beyond a predetermined range or have a value of SNR (Signal to Noise Ratio) exceeding a predetermined value; generating a broadcasting data notification message when broadcasting data are not received by predetermined frames for a predetermined time; generating a service data notification message when service data are not received at a predetermined cycle time; and generating a conditional access data notification message when conditional access data are received at a predetermined cycle time.

Further, in the method of managing the reception state of the data in the digital broadcasting system, generating the notification messages further includes interrupting monitoring functions so as to prevent the notification messages of the respective data from being generated for a predetermined time when the network notification message is generated.

The method of managing the reception state of the data in the digital broadcasting system further includes: determining whether the notification messages are transmitted to a management server or not and, if not, generating graphic data including set telephone number information and failure information corresponding to the intrinsic information on each error; and refreshing image signals according to the graphic data to be added to broadcasting signals according to broadcasting data transmitted from the service-providing server; storing program information included in service data and displaying the program information by request of a subscriber; checking whether the subscriber has authority to watch corresponding program information or not and, if so, decoding encoded broadcasting data according to key information included in conditional access data; and decompressing the decoded broadcasting data according to an MPEG coding scheme and transmitting broadcasting signals to a digital television.

According to still another aspect of the invention, there is provided a method of managing a reception state of data at a digital broadcasting receiver of a digital broadcasting system having a management server. The method includes: setting sensing information including intrinsic information on each error, intrinsic information of the management server and telephone number information of a manager; generating a network notification message including intrinsic information according to reception errors of the data received through a network; generating report signals according to the data received through the network; generating data notification messages including intrinsic information according to the reception errors of the data based on the generated report signals; transmitting the generated data notification messages to the management server according to the intrinsic information of the management server; and displaying failure information corresponding to the telephone number information and the intrinsic information on each error when the data notification messages are not transmitted to the management server.

Here, generating the report signals includes at least one of: decompressing broadcasting data received from a digital broadcasting server and in the mean time generating a broadcasting data report signal; storing service data received from a service information server to generate a service data report signal; and generating a conditional access report signal according to conditional access data received from a conditional access server in any one of an EMM (Entitle Management Message) format and an ECM (Entitle Control Message) format.

Further, generating the data notification messages includes at least one of: generating a broadcasting data notification message when the broadcasting data report signal is not received by a predetermined number of times for a predetermined time; generating a service data notification message when the service data report signal is not received at a predetermined cycle time; and generating a conditional access data notification message when the conditional access data report signal is received at a predetermined cycle time.

The method further includes, when the network notification message is generated, preventing each data notification message from being generated for a predetermined time.

The present invention can also be realized as computer-executable instructions in computer-readable media.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 5 is a view for explaining a procedure of setting sensing information according to an exemplary embodiment of the present invention;

FIG. 7 is a view for explaining a procedure where a broadcasting data sub-sensor senses a reception state of broadcasting data according to an exemplary embodiment of the present invention;

FIG. 8 is a view for explaining a procedure where a service data sub-sensor senses a reception state of service data according to an exemplary embodiment of the present invention;

DETAILED DESCRIPTION OF THE PREFERRED EMBODIMENTS

Hereinafter, an apparatus and method for managing received data in a digital broadcasting system according to the present invention will be described in detail with reference to the accompanying drawings.

Figure 1:
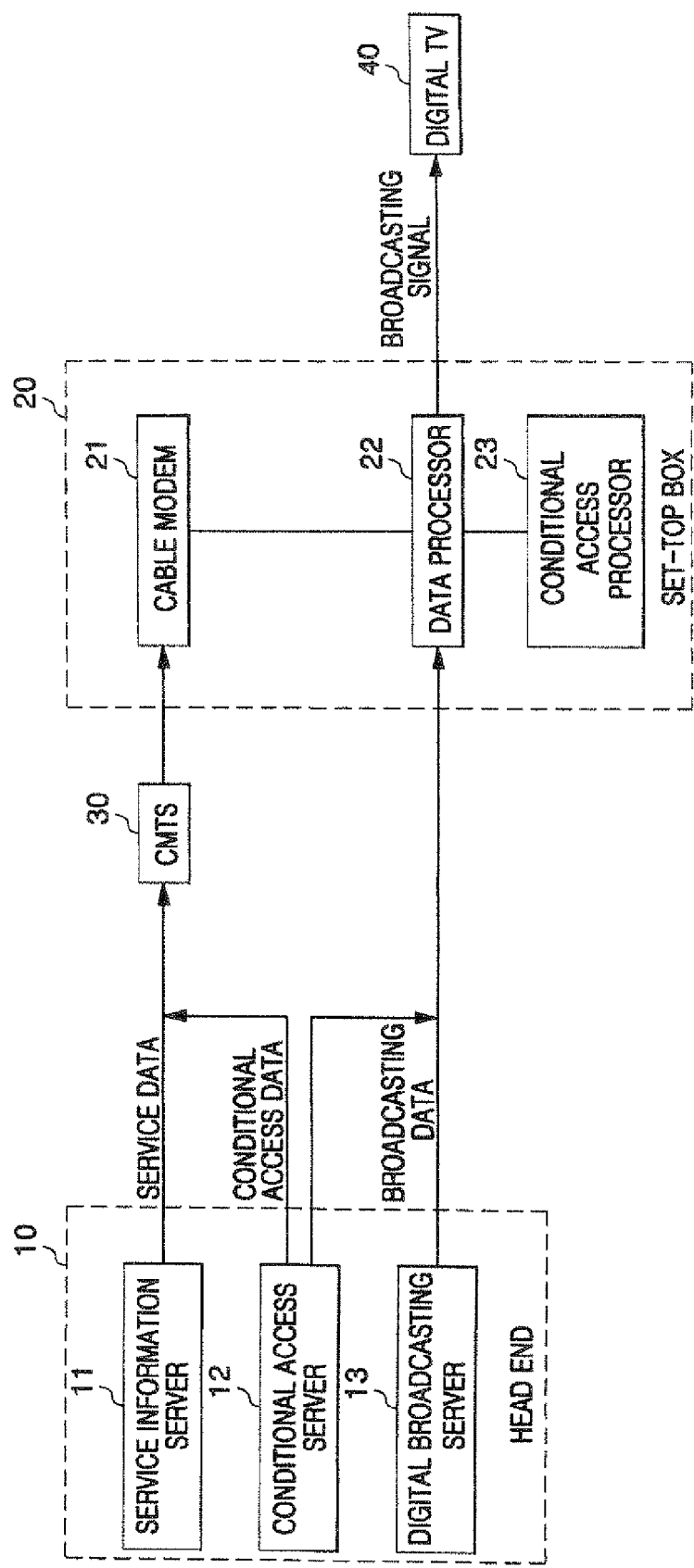
FIG. 1 is an entire block diagram for explaining network connection of a general digital broadcasting system.
Figure 2:
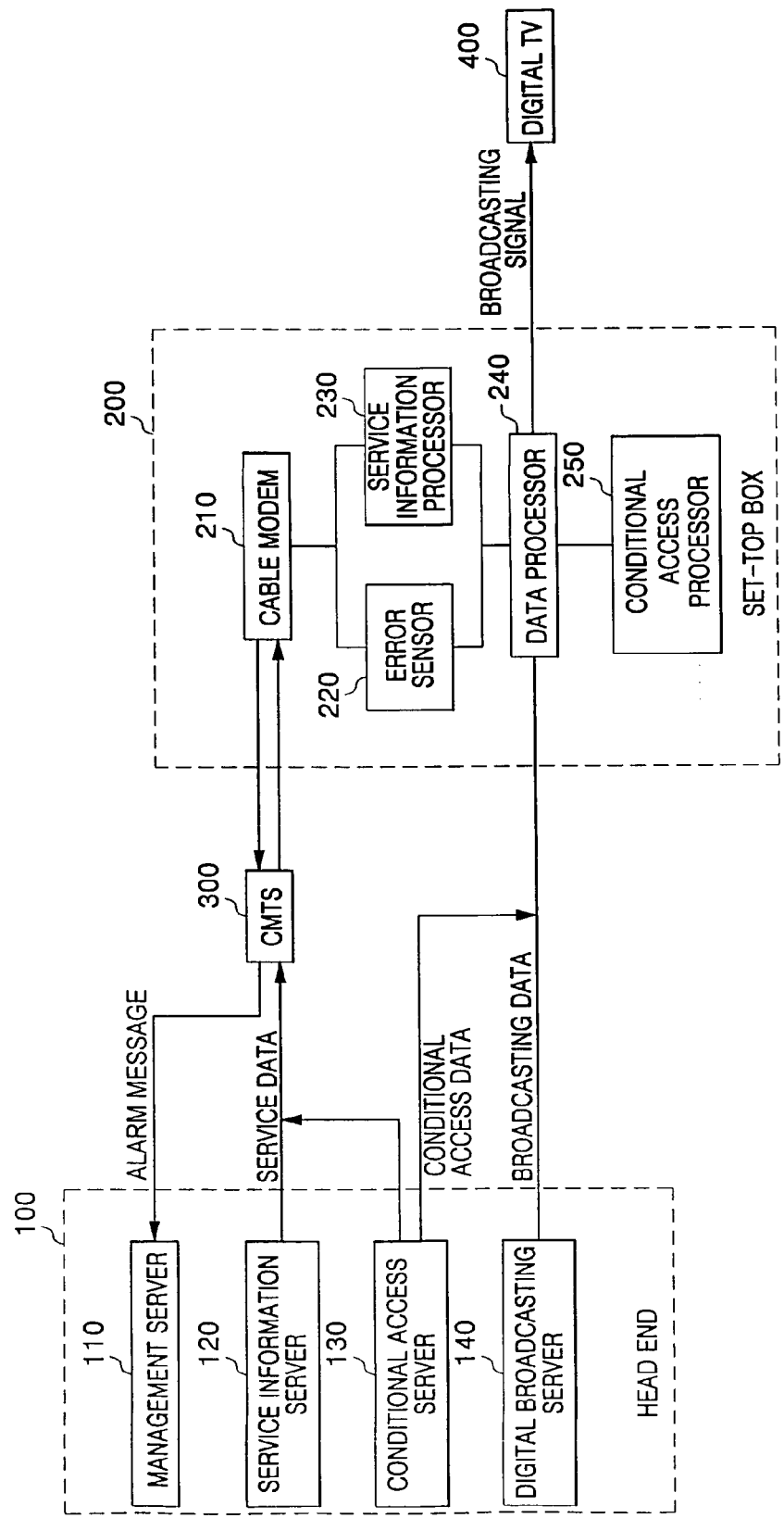
FIG. 2 is an entire block diagram for explaining a digital broadcasting system according to an exemplary embodiment of the present invention.

FIG. 2 is an entire block diagram for explaining a digital broadcasting system according to an exemplary embodiment of the present invention.

Referring to FIG. 2, the digital broadcasting system according to the invention includes a head end 100 serving as a service providing server and a set-top box 200. The head end 100 includes a management server 110, a service information server 120, a conditional access server 130, and a digital broadcasting server or a digital audio/video server 140. The set-top box 200, as a digital broadcasting receiver, includes a cable modem 210, a data processor 240, a conditional access processor 250, a service information processor 230 and an error sensor 220.

The service information server 120 transmits service data to the set-top box 200 through a CMTS (Cable Modem Termination System) 300, wherein the service data include program information or program identifier (PID) and event information of digital broadcasting services provided from the head end 100. The conditional access server 130 transmits conditional access data to the set-top box 200 either in an EMM (Entitle Management Message) form or in an ECM (Entitle Control Message) form, wherein the conditional access data contain key information capable of decoding enciphered broadcasting data and information on authority of a subscriber to watch each program.

The digital broadcasting server 140 transmits broadcasting data to the set-top box 200 through broadcasting channels depending on frequencies, wherein the broadcasting data include video data and audio data.

At this time, the digital broadcasting server 140 can encode the video and audio data so as to prevent them from maliciously reading out, compress them according to the MPEG coding scheme, and transmit them.

When a notification message is received from the set-top box 200, the management server 110 outputs an notification signal so that a manager can recognize, through a user interface (not shown), that an error is generated, or transmits a notification signal to the service information server 120, the conditional access server 130 or the digital broadcasting server 140 according to information on types of the errors which is contained in the notification message. Thereby, the corresponding server 120, 130 or 140 makes it possible to cope with the generated error through a self-diagnostic function which is ordinarily employed to it.

In this case, when the notification message is received, the management server 110 displays the error type information contained in the notification message on a display means (not shown) in a similar way to a pop-up window or outputs an alarm voice message, thereby making it possible for the manager to recognize that the error is generated on the data.

The CMTS 300 converts service data and conditional access data, which are received in a format of an IP (Internet Protocol) packet, into cable data, and transmits the converted data to the set-top box 200. Further, the CMTS 300 converts the notification message transmitted from the set-top box 200 into the IP packet format, and transmits the converted message to the management server 110.

The set-top box 200 processes the broadcasting data transmitted from the digital broadcasting server 140 into broadcasting signals according to the service data and the conditional access data which are transmitted from the service information server 120, and transmits the processed signals to the digital TV 400.

Further, the set-top box 200 monitors an error of a cable network or a broadcasting channel and a reception state of each of the data transmitted from the respective servers 120, 130 and 140. When an error of the data reception is sensed, the set-top box 200 generates the notification message according to the types of the errors and then transmits the generated notification message to the management server 110.

The cable modem 210 of the set-top box 200 provides the conditional access data and the service data, which are received from the CMTS 300 through the cable network, to the service information processor 230.

The service information processor 230 stores program information, key information and program-specific watching authority information of the corresponding subscriber on the basis of the received service data and the conditional access data. When the service data is received, the service information processor 230 provides a signal for reception report of the service data to the error sensor 220. Further, when the conditional access data is received in the EMM form, the service information processor 230 transmits a signal for reception report of the EMM conditional access data to the error sensor 220.

The conditional access processor 250 causes the broadcasting data, which are transmitted from the digital broadcasting server 140 according to the key information and the program-specific watching authority information of the corresponding subscriber that are transmitted from the conditional access server 130, to be converted into the broadcasting signals.

Specifically, when the subscriber selects the program information, the conditional access processor 250 checks whether the subscriber has authority to watch the corresponding program. When the subscriber has the watching authority, the conditional access processor 250 makes it possible to decode the encoded broadcasting data according to the key information transmitted from the conditional access server 130 and to decompress the decoded broadcasting data according to the MPEG coding scheme.

The data processor 240 decompresses the received broadcasting data according to the MPEG coding scheme, converts the decompressed broadcasting data into broadcasting signals, and transmits the converted broadcasting signals to the digital TV 400.

The error sensor 220 senses the error of the data reception according to the received report signal, generates the notification message according to types of the sensed errors, and transmits the generated notification message to the management server 110 through the cable modem 210.

Figure 3:
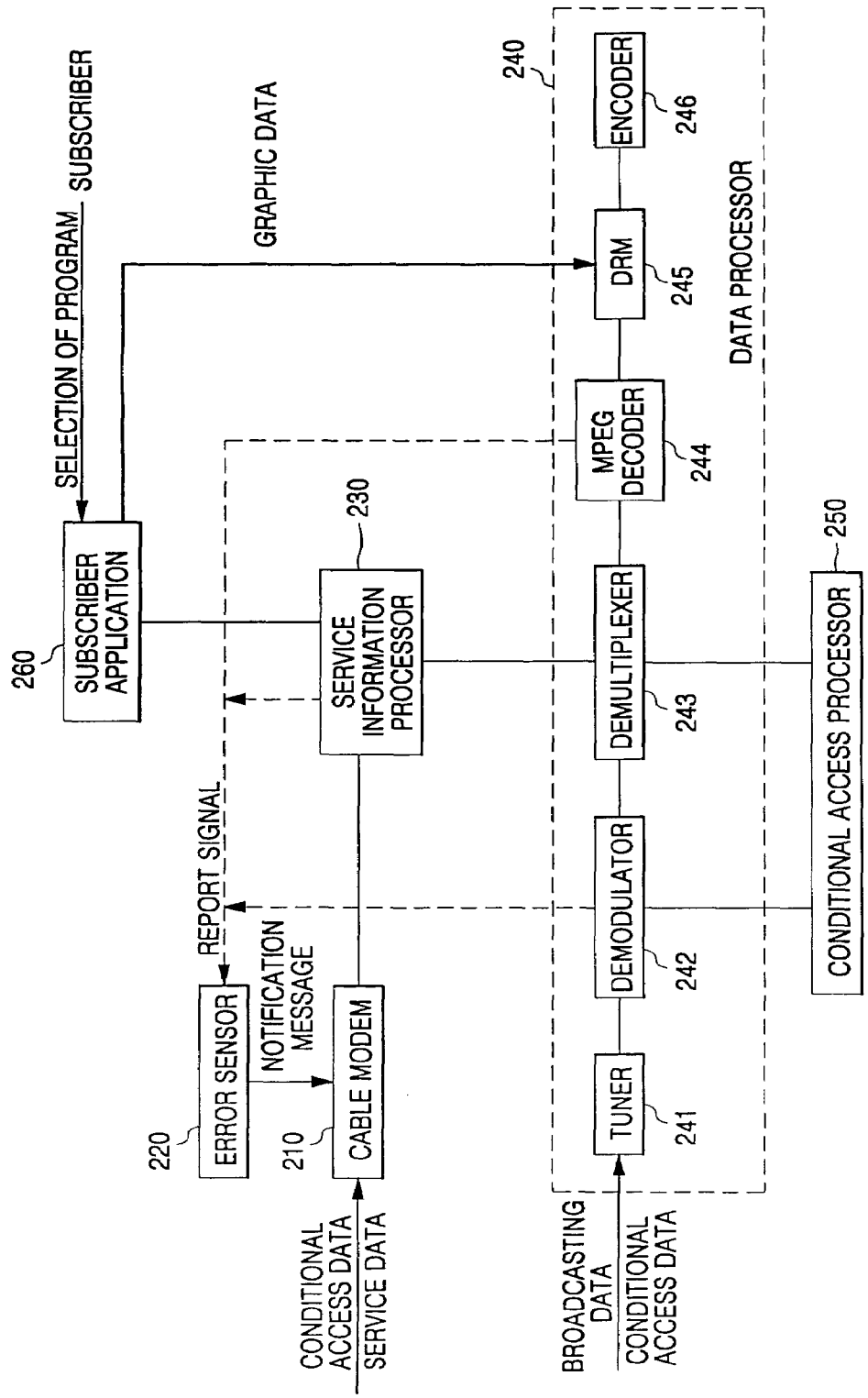
FIG. 3 is an internal block diagram for explaining a procedure where a set-top box according to an exemplary embodiment of the present invention processes data.

FIG. 3 is an internal block diagram for explaining a procedure where a set-top box according to an exemplary embodiment of the present invention processes data.

Referring to FIG. 3, the data processor 240 includes a tuner 241, a demodulator 242, a demultiplexer 243, an MPEG decoder 244, a DRM (Display Refresh Module) 245 and an encoder 246.

The tuner 241 tunes both the broadcasting data and the conditional access data which are received in an analog signal form. The demodulator 242 converts the tuned broadcasting and conditional access data of the analog signal form into those of a digital signal form.

Further, the demodulator 242 transmits the conditional access data of the digital signal form, namely the key information and the program-specific watching authority information, to the conditional access processor 250.

The demultiplexer 243 performs reverse-coding to the broadcasting data converted into the digital signal form, and converts the reverse-coded broadcasting data into that of the MPEG coding scheme.

Among the broadcasting data reverse-coded at the demultiplexer 243, the video data has an MPEG-2 format, and the audio data has an MPEG-1 format.

At this time, when a subscriber selects a program channel, the conditional access processor 250 checks whether the subscriber has authority to watch the program channel based on the program-specific watching authority information. If the subscriber has the authority, the conditional access processor 250 makes the encoded broadcasting data decoded according to the key information.

The MPEG decoder 244 decompresses the reverse-coded broadcasting data according to the MPEG coding scheme and converts the decompressed broadcasting data into the broadcasting signals. The DRM 245 refreshes the converted broadcasting signals to be displayed on the digital TV 400.

In this case, the MPEG decoder 244 decompresses the broadcasting data reverse-coded at the demultiplexer 243 according to the MPEG coding scheme, and transmits a broadcasting data report signal to the error sensor 220.

For example, when the broadcasting data are transmitted at a rate of 30 frames per second and are normally received in the digital broadcasting system, the MPEG decoder 244 transmits the broadcasting data report signal to the error sensor 220 at a rate of 30 times per second.

The encoder 246 converts the refreshed broadcasting signals into those of the analog signal form, and transmitted the converted broadcasting signals to the digital TV 400.

Meanwhile, the cable modem 210 converts the service data and the conditional access data, which are received through the CMTS 300 in the IP packet format, into cable data. Then, the cable modem 210 transmits the service information containing the program information and the event information to the service information processor 230, and transmits the conditional access data of the ECM format to the conditional access processor 250.

At this time, when the service data are received, the service information processor 230 transmits a service data report signal to the error sensor 220. Further, when the conditional access data of the ECM format are received, the service information processor 230 transmits an ECM conditional access data report signal to the error sensor 220.

A subscriber application 260 permits the subscriber to select a desired program channel.

Specifically, the subscriber application 260 transmits graphic data to the DRM 245 so that the subscriber can select the program channel either directly or through a remote controller (e.g., infrared remote controller) to thereby permit a channel image according to the program information stored in the service information processor 230 to be displayed. The DRM 245 refreshes the program information, which the subscriber intends to select through a certain region of the digital TV 400 to be displayed.

The error sensor 220 senses data reception errors based on report signals which are transmitted from the demodulator 242, the service information processor 230 and the MPEG decoder 244 respectively, generates notification messages according to types of the sensed data reception errors, and transmits the generated notification messages to the management server 110 through the cable modem 210.

Figure 4:
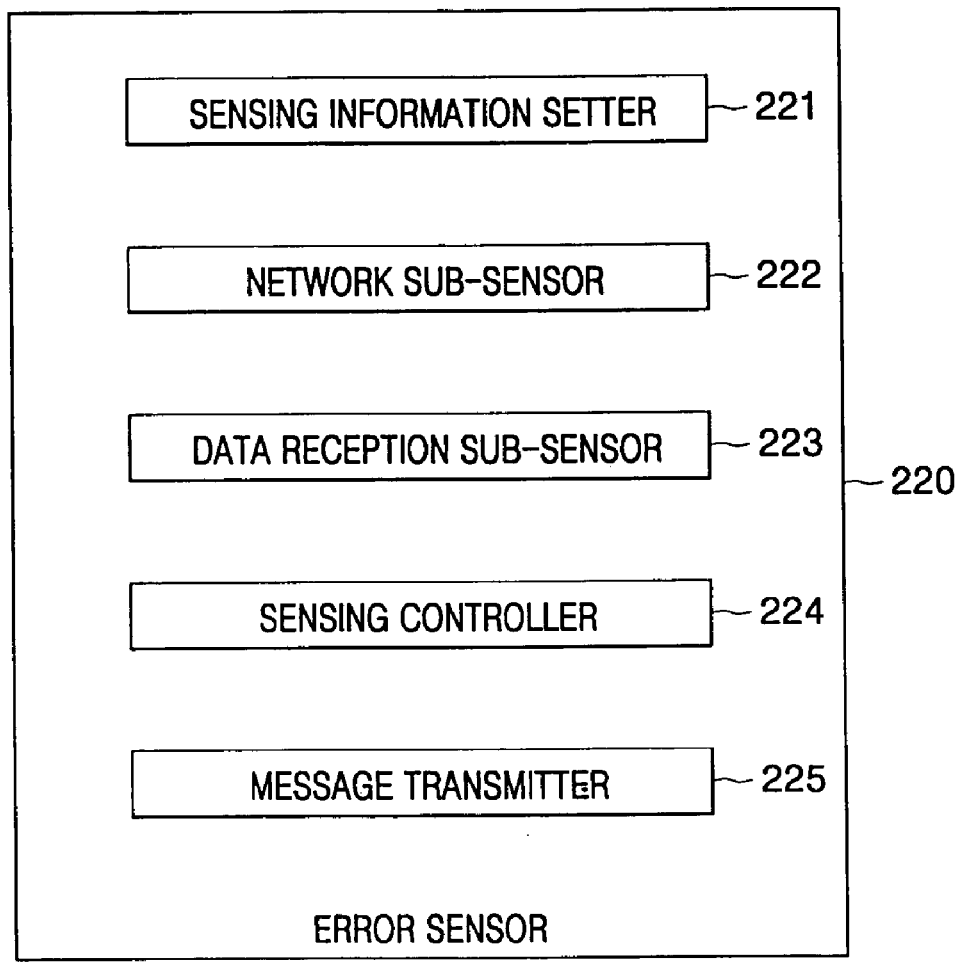
FIG. 4 is an internal block diagram for explaining an error sensor according to an exemplary embodiment of the present invention.

FIG. 4 is an internal block diagram for explaining an error sensor according to an exemplary embodiment of the present invention.

Referring to FIG. 4, the error sensor 220 according to the invention includes a sensing information setter 221, a network sub-sensor 222, a data reception sub-sensor 223, a sensing controller 224 and a message transmitter 225.

The sensing information setter 221 sets code information and intrinsic information of the corresponding set-top box 200, wherein the code information are based on errors of the cable network, the broadcasting channel and the respective servers 120, 130 and 140 of the head end 100 according to setting of a manager of the digital broadcasting system.

FIG. 5 is a view for explaining a procedure of setting sensing information according to an exemplary embodiment of the present invention. As shown in FIG. 5, the sensing information setter 221 sets whether to sense the errors of the cable network, the broadcasting channel and the head end 100 according to the setting of the manager (menu a), and sets address information of the management server 110 to transmit the notification messages generated by the errors and telephone number information of the manager (menu b). Here, the address information of the management server 110 may be IP address information.

The sensing information setter 221 sets intrinsic information of an area where the corresponding set-top box 200 is installed (menu c) and a cycle time of transmitting the notification messages (menu d).

In this case, the set-top box 200 sensing the error of the head end 100, the cable network or the broadcasting channel, preferably, is any one selected from a plurality of set-top boxes installed within a given area. Specifically, any one of the plurality of set-top boxes 200 receiving the data from the identical head end 100 is preferably designed to sense the error.

Further, the sensing information setter 221 sets information on an error type of the cable network through which the cable modem 210 receives the data as well as error code information depending on each error type (menu e), and sets information on an error type of the broadcasting channel through which the broadcasting data are received from the digital broadcasting server 140 as well as error code information depending on the each error type (menu f).

Furthermore, the sensing information setter 221 sets information on an error type of the head end 100 as well as error code information depending on the each error type (menu g).

In other words, the sensing information setter 221 sets code information according to the error of the broadcasting data transmitted from the digital broadcasting server 140, code information according to the error of the service data (SI) transmitted from the service information server 120, and code information according to the error of the conditional access data (CA) transmitted from the conditional access server 130.

Moreover, the network sub-sensor 222 senses errors of the data which are received either through the CMTS 300 or the broadcasting channel to generate notification messages.

Figure 6A:
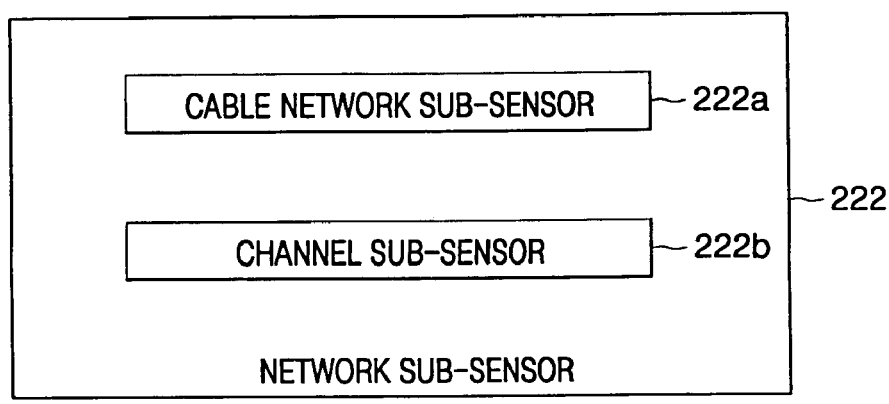
FIG. 6A is an internal block diagram for explaining a network sub-sensor according to the present invention.

FIG. 6A is an internal block diagram for explaining a network sub-sensor 222 according to the present invention. As shown in FIG. 6A, the network sub-sensor 222 according to the invention includes a cable network sub-sensor 222a and a channel sensor 222b.

The cable network sub-sensor 222a determines that an error is generated on the cable network when the service data and the conditional access data which are received through the cable modem 210 have a received power level beyond a predetermined range or a value of SNR (Signal to Noise Ratio) exceeding a predetermined value, thus generating a cable network notification message.

In this case, when the received power level is not within a range between about +15 dBmV and −15 dBmV, the cable network sub-sensor 222a preferably determines that the error is generated on the cable network.

The channel sensor 222b determines that an error is generated on the broadcasting channel when the broadcasting data of the analog signal form which are received through the digital broadcasting server 140 have a received power level beyond a predetermined range or a value of SNR (Signal to Noise Ratio) exceeding a predetermined value, thus generating a channel notification message.

Meanwhile, the data reception sub-sensor 223 generates notification messages depending on a reception state of each of the data which are transmitted from the digital broadcasting server 140, service information server 120 and conditional access server 130 of the head end 100.

Figure 6B:
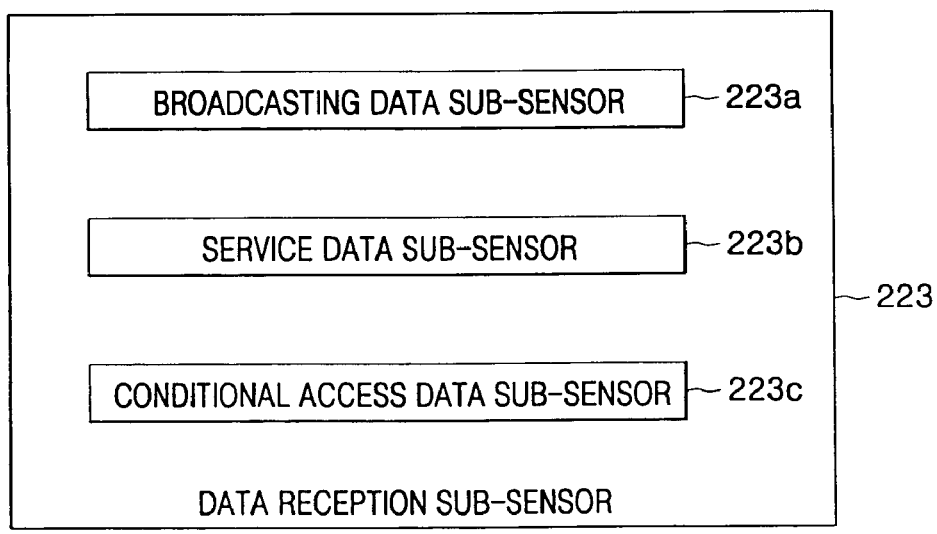
FIG. 6B is an internal block diagram for explaining a data reception sub-sensor according to the present invention.

FIG. 6B is an internal block diagram for explaining a data reception 223 sub-sensor according to the present invention.

As shown in FIG. 6B, the data reception sub-sensor 223 includes a broadcasting data sub-sensor 223a, a service data sub-sensor 223b and a conditional access data sub-sensor 223c.

The broadcasting data sub-sensor 223a monitors a reception state of the broadcasting data according to a broadcasting data report signal transmitted from the MPEG decoder 244. When an error is sensed, the broadcasting data sub-sensor 223a generates a broadcasting data notification message.

FIG. 7 is a view for explaining a procedure where a broadcasting data sub-sensor senses a reception state of broadcasting data according to an exemplary embodiment of the present invention.

As shown in FIG. 7, the demodulator 242 converts received broadcasting data of an analog signal form into those of a digital signal form. The MPEG decoder 244 decompresses the converted broadcasting data according to the MPEG coding scheme, and in the mean time transmits a broadcasting data report signal report-decode-complete to the broadcasting data sub-sensor 223a of the error sensor 220.

The broadcasting data sub-sensor 223a checks whether the broadcasting data report signal transmitted from the MPEG decoder 244 is received at a rate of 30 times per second or not. If the broadcasting data report signal is received at a rate less than 30 times per second, the broadcasting data sub-sensor 223a determines that an error is generated on the digital broadcasting server 140 transmitting the broadcasting data, thus generating a broadcasting data notification message.

Meanwhile, the service data sub-sensor 223b monitors a reception state of service databased on a service data report signal received from the service information processor 230. When an error is sensed, the service data sub-sensor 223b generates a service data notification message.

FIG. 8 is a view for explaining a procedure where a service data sub-sensor senses a reception state of service data according to an exemplary embodiment of the present invention.

As shown in FIG. 8, the service information server 120 transmits service data to the data processor 240 through the cable modem 210.

The data processor 240 transmits the received service data to the service information processor 230. When the service data are received from the data processor 240, a service information receiver 231 of the service information processor 230 stores the received service data in a database 232, and in the mean time transmits a service data report signal report-stt-receive to the service data sub-sensor 223b of the error sensor 220.

The following Table 1 is for explaining a transmission cycle time of the service data which the service information server 120 transmits.

TABLE 1

| Table | STT | MGT | S-VCT | L-VCT | RRT |
|---|---|---|---|---|---|
| Cycle time | 1 min | 500 msec | 2 min | 2 min | 1 min |

As listed in Table 1, the service information server 120 transmits the STT (System Time Table) data at a cycle time of 1 min, the MGT (Master Guide Table) data at a cycle time of 500 msec, the S-VCT (Short-Virtual Table) data at a cycle time of 2 min, the L-VCT (Long-Virtual Table) data at a cycle time of 2 min, and the RRT (Routing Region Table) data at a cycle time of 1 min.

Therefore, the service data sub-sensor 223b can determine that the service information server 120 is normal or abnormal based on whether a received service data report signal is periodically received.

For example, in regard to making use of the STT data which the service information server 120 transmits at the cycle time of 1 min (minute), when the STT data are received, the service information processor 230 transmits the service data report signal report-stt-receive to the service data sub-sensor 223b.

The service data sub-sensor 223b checks whether the service data report signal is received from the service information processor 230 at the cycle time of 1 minute. If the service data report signal is not received at such a cycle time, the service data sub-sensor 223b generates a service data notification message.

Further, the conditional access data sub-sensor 223c monitors a reception state of the conditional access databased on an EMM conditional access data report signal transmitted from the service information processor 230 or an ECM conditional access report signal transmitted from the demodulator 242. When an error is sensed, the conditional access data sub-sensor 223c generates a conditional access data notification message.

Figure 9:
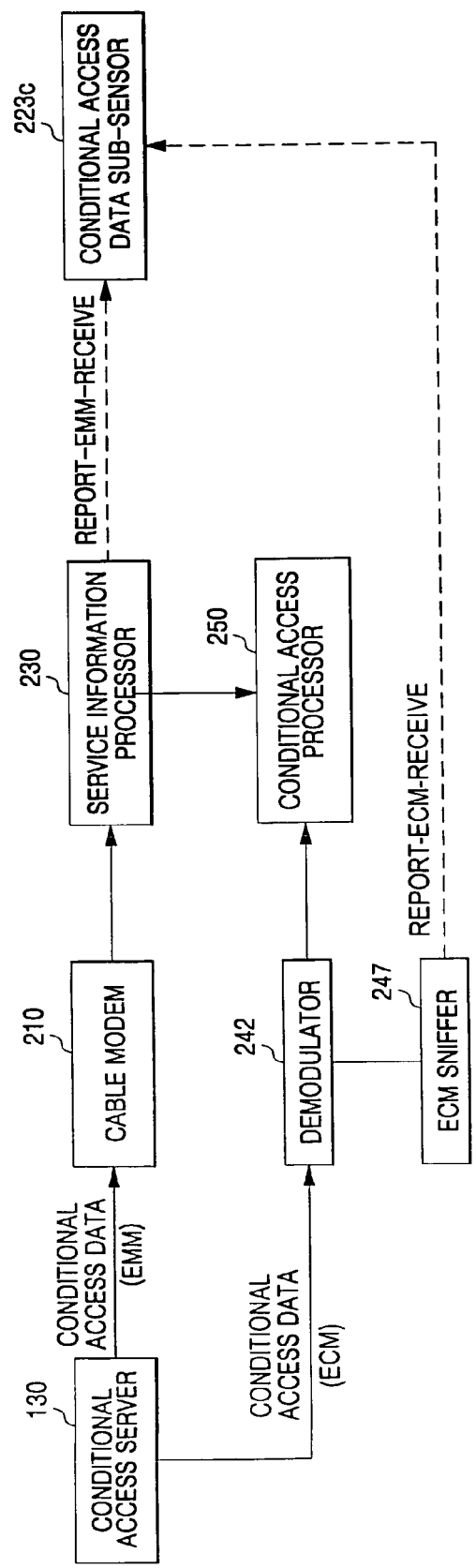
FIG. 9 is a view for explaining a procedure where a conditional access data sub-sensor senses a reception state of conditional access data according to an exemplary embodiment of the present invention.

FIG. 9 is a view for explaining a procedure where a conditional access data sub-sensor senses a reception state of conditional access data according to an exemplary embodiment of the present invention.

As shown in FIG. 9, the conditional access server 130 can transmit conditional access data to the conditional access processor 250 of the set-top box 200 through the cable modem 210 either in an EMM format or an ECM format.

To begin with, when the conditional access server 130 transmits the conditional access data through the cable modem 210 in the EMM format, the service information processor 230 transmits the received conditional access data to the conditional access processor 250 and in the mean time transmits the EMM conditional access data report signal report-emm-receive to the conditional access data sub-sensor 223c.

The conditional access data sub-sensor 223c generates an EMM conditional access data notification signal based on a reception state of the EMM conditional access data report signal. Specifically, when the EMM conditional access data report signal is not received every predetermined time, the conditional access data sub-sensor 223c determines that an error is generated on the conditional access data transmitted in the EMM format, thus generating an EMM conditional access data notification message.

Meanwhile, when the conditional access server 130 transmits the conditional access data in the ECM format, the demodulator 242 of the data processor 240 transmits the received conditional access data to the conditional access processor 250.

An ECM sniffer 247 sniffs the conditional access data transmitted from the demodulator 242 to the conditional access processor 250, and transmits an ECM conditional access data report signal report-ecm-receive to the conditional access data sub-sensor 223c.

At this time, the ECM sniffer 247 may be realized within the demodulator 242 either by a software module or a separate module.

The conditional access data sub-sensor 223c checks whether the ECM conditional access data report signal is received at a predetermined cycle time or not. If the ECM conditional access data report signal is not received, the conditional access data sub-sensor 223c determines that an error is generated on the conditional access data received in the ECM format, thus generating an ECM conditional access data notification message.

The following Table 2 is for explaining information included in the notification messages which the network sub-sensor 222 and the data reception sub-sensor 223 generate.

TABLE 2

| | | Size (byte) | Remark |
|---|---|---|---|
| Protocol | UDP | | |
| Port number | 4949 | | |
| Syntax | Mode code | 20 | SMT-2000C |
| | Serial number | 40 | 462391BN30053 |
| | S/W version | 3 | 1.7.0 |
| | Installation code | 2 | 2563 |
| | Error code | 1 | 01 |
| | Error subcode | 4 | Program number |
| | Time | 4 | ANSI standard |

As listed in Table 2, both the network sub-sensor 222 and the data reception sub-sensor 223 can generate the notification messages in which the code information on each error type set at the sensing information setter 221 is included.

Specifically, the network sub-sensor 222 and the data reception sub-sensor 223 can generate the notification messages according to the code information on each error type which the manager sets through the sensing information setter 221 and the intrinsic information of the corresponding set-top box 200, and transmit the generated notification messages to the management server 110 through the IP network.

Table 2 is for explaining the cable network notification message generated when the cable network sub-sensor 222a fails to receive the data through the cable network by way of an example, i.e., when the cable network is disconnected. It is clearly shown in Table 2 that a transmission protocol of the notification message complies with a UDP (User Datagram Protocol) and that a transmission port makes use of a '4949' port.

It is also clearly shown that a model of the set-top box 200 transmitting the cable network notification message is named 'SMT-2000C', that a serial number is '462391BN30053' and that a version of software mounted on the error sensor 220 is '1.7.0'.

Furthermore, it is clearly shown that code information of an area where the corresponding set-top box 200 is installed is '2563', and that code information on a generated error is '01' which means that no data is received through the cable network. In addition, information on a time to transmit the cable network notification message is shown.

Here, information on an error subcode may be additional information on types of generated errors. For example, when the data is not received through the cable network or the broadcasting channel, the error subcode information may be frequency information of currently received data. When a received power level is not within a predetermined range, the error subcode information may be level information of currently received power.

Further, when a value of SNR of the data received through the cable network or the broadcasting channel exceeds a predetermined value, the error subcode information may be a current value of SNR. When the broadcasting information is not received, the error subcode information may be the corresponding program information.

Meanwhile, the sensing controller 224 controls errors of the network sub-sensor 222 or the respective sensors 223a, 223b and 223c of the data reception sub-sensor 223.

In other words, the sensing controller 224 is adapted to preferentially sense the error of the cable network or the broadcasting channel. When no notification message is generated at the network sub-sensor 222, the sensing controller 224 causes the data reception sub-sensor 223 to sense a reception state of each of the data to generate the notification message.

For example, the sensing controller 224 prevents the service data notification message or the EMM conditional access data notification message from being generated at the service data sub-sensor 223b and the conditional access data sub-sensor 223c for a predetermined time after the cable network notification message is generated at the cable network (broadcasting data) sub-sensor 223a.

In this manner, the reason why the sensing controller 224 prevents the service data notification message or the EMM conditional access data notification message from being generated for a predetermined time after transmitting the cable network notification message to the management server 110 is because it is natural that errors are generated on the service and conditional access data received through the cable modem 210 when an error is generated on the cable network. For this reason, it is unnecessary to transmit the service data notification message or the EMM conditional access data notification message within a predetermined time after the cable network notification message is transmitted to the management server 110.

Similarly, the sensing controller 224 prevents the broadcasting data sub-sensor 223a and the conditional access data sub-sensor 223c from generating the broadcasting data notification message or the ECM conditional access data notification message after the channel sub-sensor 222b transmits the channel notification message to the management server 110, and then from transmitting the broadcasting data notification message or the ECM conditional access data notification message to the management server 110.

Further, when no notification message is transmitted to the management server 110 through the message transmitter 225, i.e., when no notification message is uploaded to the management server 110 through the cable modem 210, the sensing controller 224 transmits the graphic data to the subscriber application 260, wherein the graphic data contain both the telephone number information and the error generation information corresponding to the error-specific code information, both of which are set at the sensing information setter 221.

The subscriber application 260 transmits the received graphic data to the DRM (Display Refresh Module) 245. Then, the DRM 245 refreshes the telephone number information and the error generation information according to the graphic information to be displayed through the digital TV 400.

Figure 10:
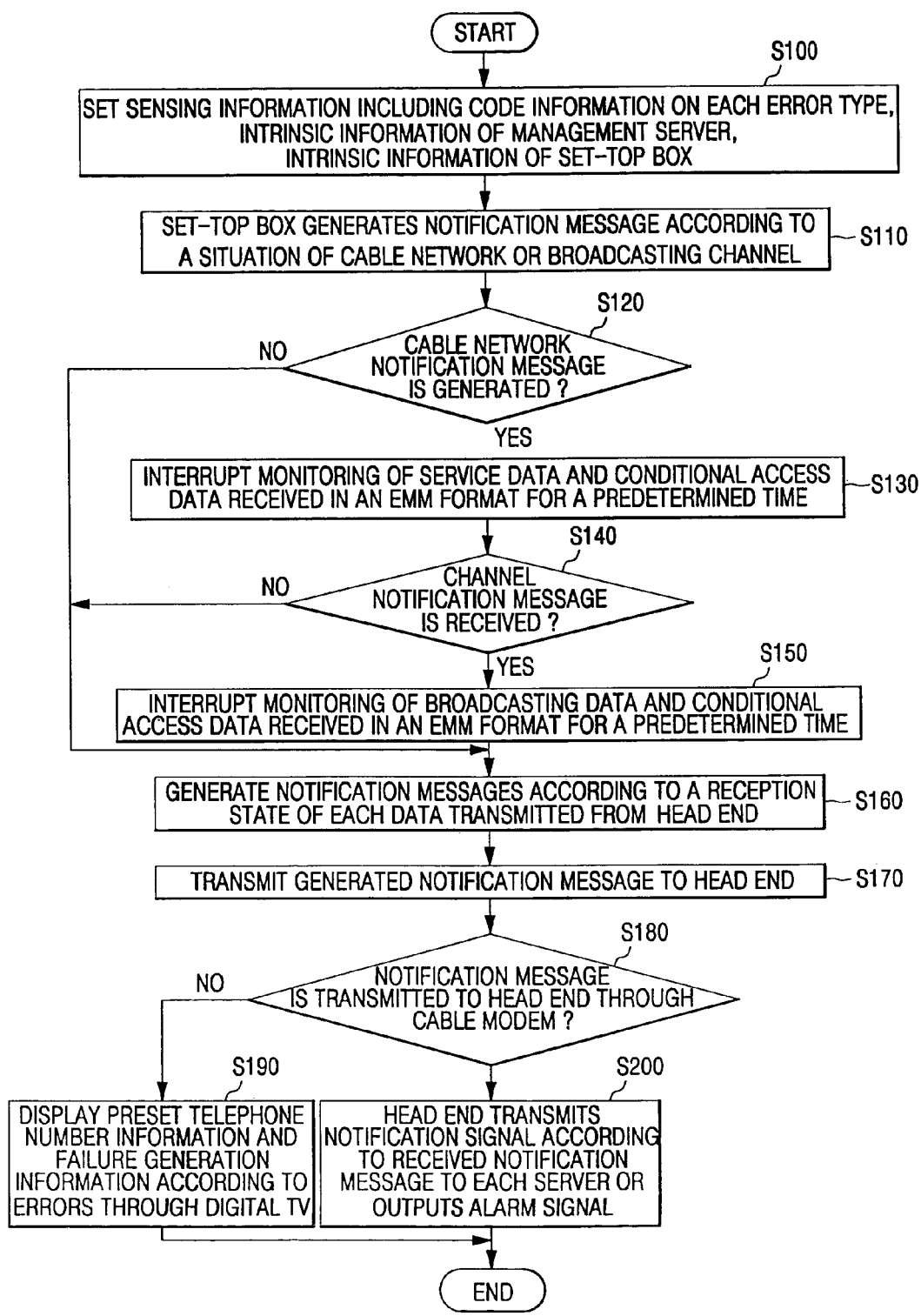
FIG. 10 is a flow chart for explaining a method of managing a state of a digital broadcasting system according to an exemplary embodiment of the present invention.

FIG. 10 is a flow chart for explaining a method of managing a state of a digital broadcasting system according to an exemplary embodiment of the present invention.

Referring to FIG. 10, a manager of the digital broadcasting system sets various sensing information to the set-top box 200 through the sensing information setter 221, wherein the various sensing information include code information on each error type, intrinsic information of the management server 110, intrinsic information of the set-top box 200 and so forth (S100).

The code information on each error type may include intrinsic information according to types of the errors which are generated on the cable network, the broadcasting channel, and the respective servers 110, 120 and 130 of the head end 100. The intrinsic information of the management server 110 may include IP address information of the management server 110 constituting the head end 100 and telephone number information of the manager who manages the digital broadcasting system through the management server 110.

In addition, the intrinsic information of the set-top box 200 may include code information of an area where the corresponding set-top box 200 is installed, information on a cycle time when the corresponding set-top box 200 transmits the notification message and so forth.

When the manager set the sensing information, the error sensor 220 of the set-top box 200 senses an error of the cable network or the broadcasting channel, and generates a cable network notification message or a channel notification message (S110).

According to an example, when service data or conditional access data received through the cable network in an analog signal form have a received power level beyond a predetermined range or a value of SNR exceeding a predetermined value, the network sub-sensor 222 of the set-top box 200 generates a cable network notification message.

Further, when broadcasting data or conditional access data received through the broadcasting channel in an analog signal form have a received power level beyond a predetermined range or a value of SNR exceeding a predetermined value, the network sub-sensor 222 generates a channel notification message.

In this case, when the received power level of a received analog signal is beyond a range between about +15 dBmV and −15 dBmV, the network sub-sensor 222 may generate the cable network notification message or the channel notification message.

The sensing controller 224 checks whether the cable network notification message is generated at the error sensor 120 or not (S120).

When the cable network notification message is generated, the sensing controller 224 prevents a service data notification message and an EMM conditional access data notification message from being generated for a predetermined time (S130).

Further, the sensing controller 224 checks whether the channel notification message is generated or not (S140). When the channel notification message is generated, the sensing controller 224 prevents a broadcasting data notification message and an ECM conditional access data notification message from being generated for a predetermined time (S150).

At this time, at the sensing controller 224, the predetermined time when the cable network notification message or the channel notification message is made to be generated and each notification message is not made to be generated is preferably set to a predetermined time when the error generated on the cable network or the broadcasting channel is removed.

The set-top box 200 checks whether each of the data transmitted from the respective server 110, 120 and 130 of the head end 100 is normally received or not, when the cable network notification message and the channel notification message are not generated, then generating a data notification message (S160).

Figure 11A:
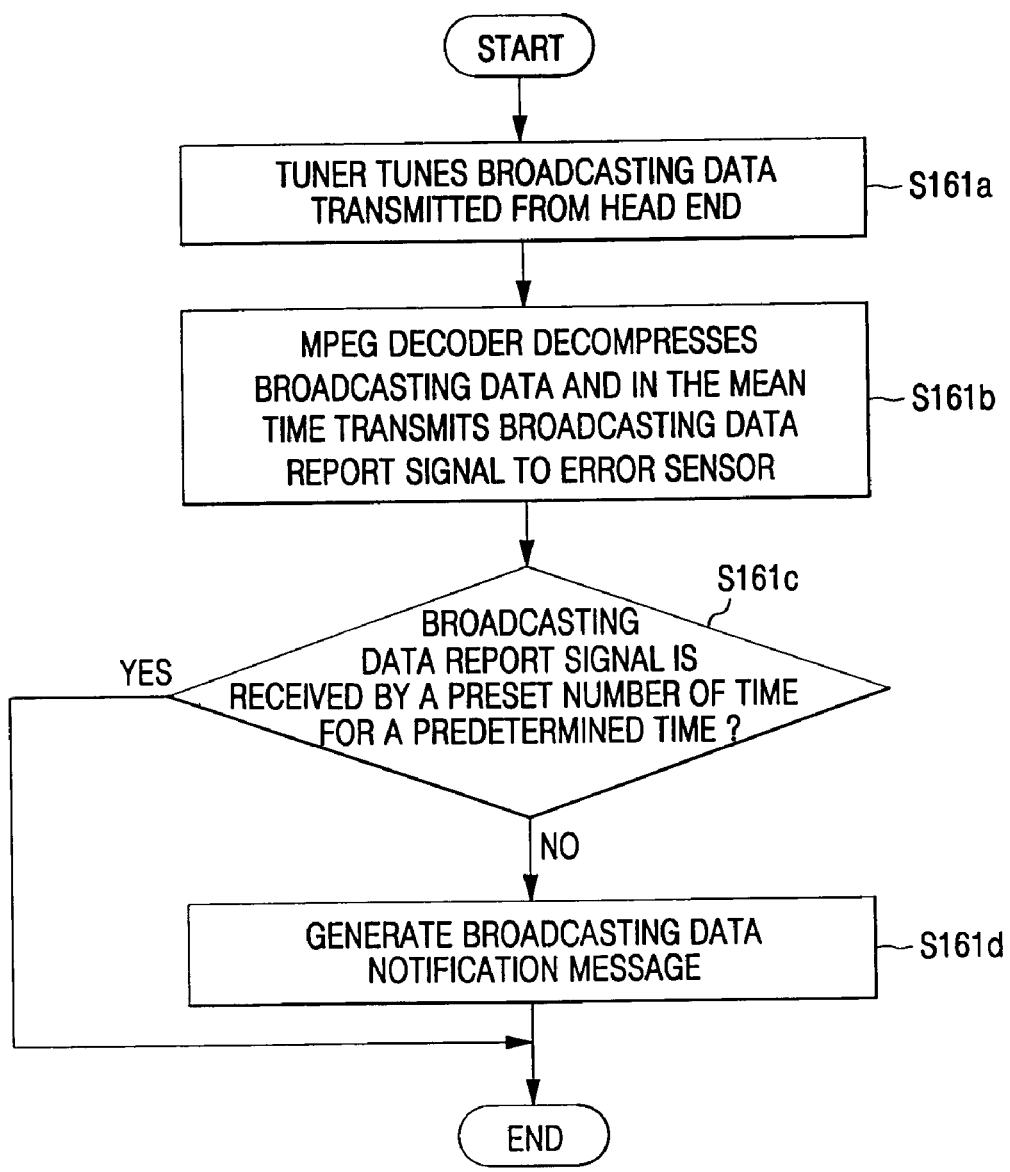
FIG. 11A is a flow chart explaining a procedure of generating a broadcasting data notification message according to an exemplary embodiment of the present invention.

FIG. 11A is a flow chart explaining a procedure of generating a broadcasting data notification message according to an exemplary embodiment of the present invention.

Referring to FIG. 11A, the tuner 241 of the set-top box 200 tunes broadcasting data of an analog signal form through the broadcasting channel according to program information which a subscriber selects (S161*a*).

The demodulator 242 converts the broadcasting data of the analog signal form into those of a digital signal form. The demultiplexer 243 performs reverse-coding of the broadcasting data.

The MPEG decoder 244 decompresses the broadcasting data according to an MPEG coding scheme, and in the mean time transmits a broadcasting data report signal to the error sensor 220 (S161*b*).

Moreover, the error sensor 220 checks whether the broadcasting data report signal is normally received from the MPEG decoder 244 or not (S161*c*).

When the digital broadcasting server 140 transmits the broadcasting data of 30 frames per second by way of an example, the error sensor 220 checks whether the broadcasting data report signal is received from the MPEG decoder 244 at a rate of 30 times per second or not.

When the broadcasting data report signal is not received at the rate of 30 times per second, the error sensor 220 determines that an error is generated at the digital broadcasting server 140, thus generating a broadcasting data notification message (S161*d*).

Figure 11B:
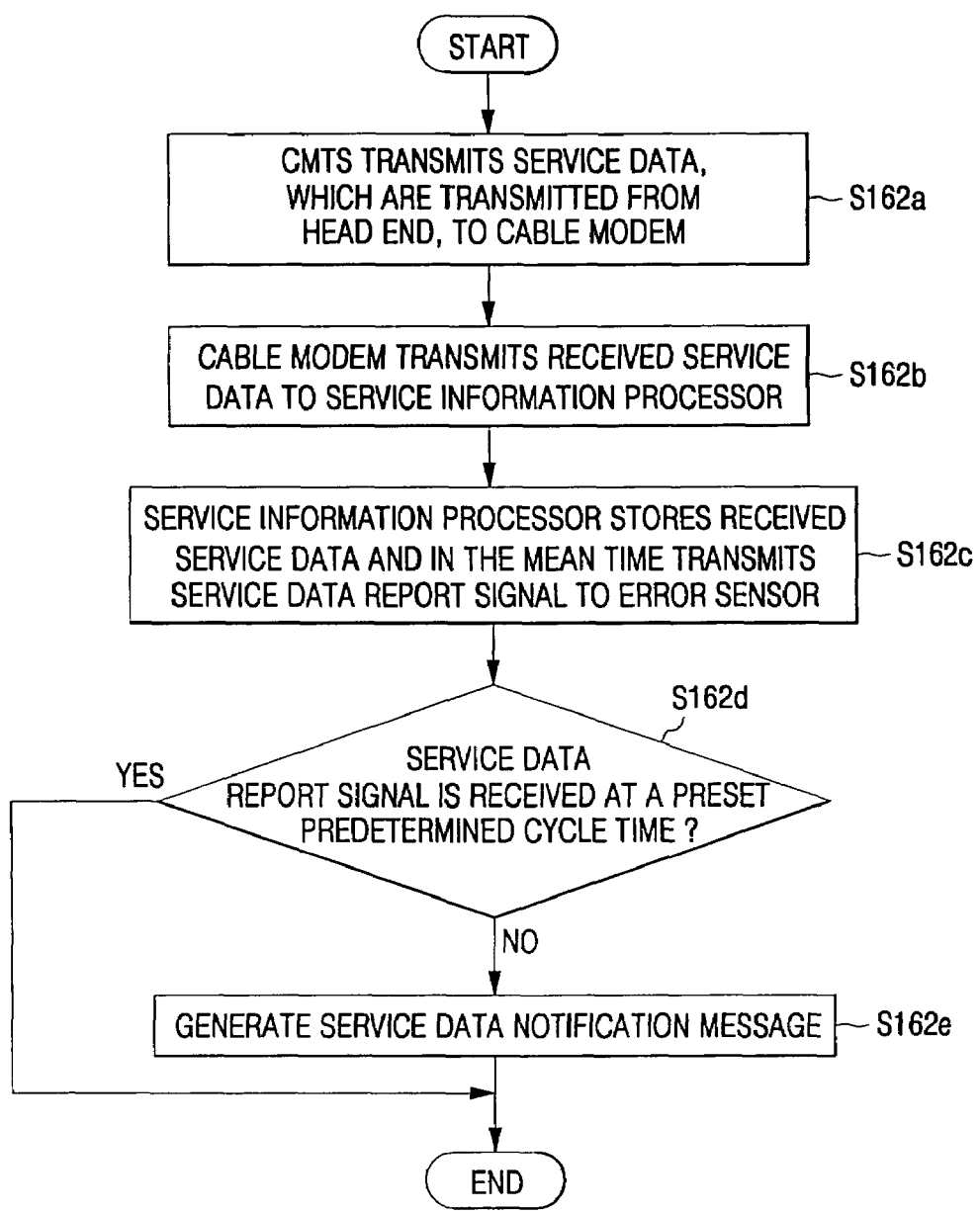
FIG. 11B is a flow chart explaining a procedure of generating a service data notification message according to an exemplary embodiment of the present invention.

FIG. 11B is a flow chart explaining a procedure of generating a service data notification message according to an exemplary embodiment of the present invention.

Referring to FIG. 11B, the service information server 120 transmits service data including program information and event information, which are provided at the head end 100, to the CMTS 300 through the IP network. The CMTS 300 converts the service data of an IP packet format into cable data and transmits the converted cable data into the set-top box 200 (S162*a*).

The cable modem 210 of the set-top box 200 transmits the received service data to the service information processor 230 (S162*b*).

The service information processor 230 stores the program information, the event information, etc., which are included in the received service data in the database 232 of the service information processor 230, and in the mean time transmits a service data report signal to the error sensor 220 (S162*c*).

The error sensor 220 checks whether the service data report signal is received from the service information processor 230 at a preset predetermined cycle time or not (S162*d*).

When STT (System Time Table) data, which the service information server 120 transmits at a cycle time of 1 min is used, the error sensor 220 checks whether the service data report signal is received at the cycle time of 1 minute. If the service data report signal is periodically received, the error sensor determines that an error is generated at the service information server 120, thus generating a service data notification message (S162*e*).

Figure 11C:
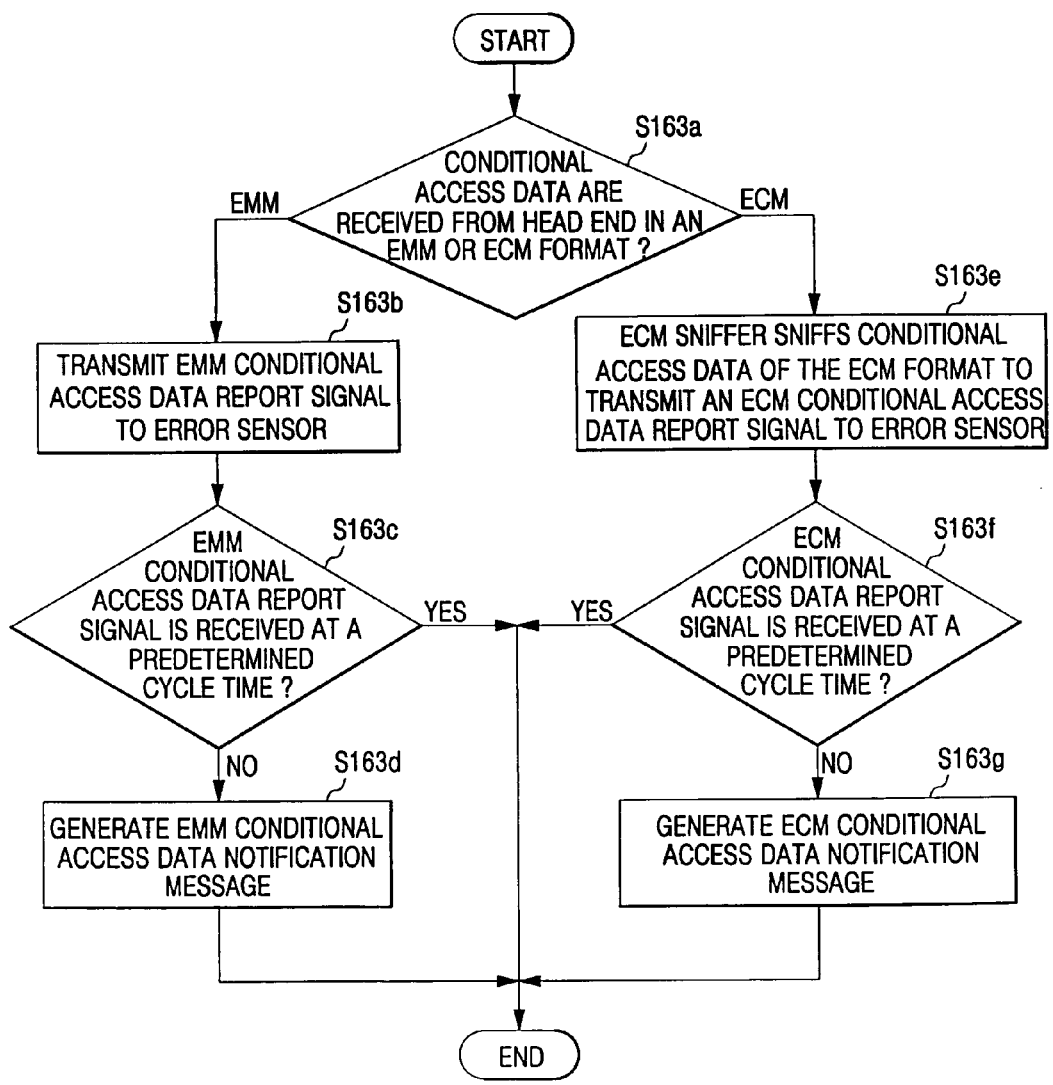
FIG. 11C is a flow chart explaining a procedure of generating a conditional access data notification message according to an exemplary embodiment of the present invention.

FIG. 11C is a flow chart explaining a procedure of generating a conditional access data notification message according to an exemplary embodiment of the present invention.

Referring to FIG. 11C, the conditional access server 130 of the head end 100 transmits conditional access data to the cable modem 210 in an EMM format or transmits conditional access data to the set-top box 200 in an ECM format (S163*a*).

The cable modem 210 transmits the conditional access data received in the EMM format to the service information processor 230. The service information processor 230 transmits the conditional access data to the conditional access processor 250 and in the mean time transmits an EMM conditional access data report signal to the error sensor 220 (S163b).

The error sensor 220 checks whether the EMM conditional access data report signal is received from the service information processor 230 at a predetermined cycle time or not (S163c). If the EMM conditional access data report signal is not received at the predetermined cycle time, the error sensor 220 generates an EMM conditional access data notification message (S163d).

Meanwhile, the demodulator 242 of the data processor 240 transmits the conditional access data received in the ECM format to the conditional access processor 250. The ECM sniffer 247 sniffs the conditional access data transmitted from the demodulator 242 to the conditional access processor 250 and then transmits an ECM conditional access data report signal to the error sensor 220 (S163e).

The error sensor 220 checks whether the ECM conditional access data report signal is received from the ECM sniffer 247 at a predetermined cycle time or not (S163f). If the ECM conditional access data report signal is not received at the predetermined cycle time, the error sensor 220 generates an ECM conditional access data notification message (S163g).

Here, the notification message generated at the error sensor 220 includes code information on each error type, intrinsic information of the management server 110, intrinsic information of the set-top box 200 and so forth.

The error sensor 220 transmits the generated notification message to the management server 110 through the cable modem 210 (S170), and checks whether the notification message is transmitted to the management server 110 of the head end 100 through the cable modem 210 or not (S180).

When the notification message caused by the error of the cable modem 210 or the cable network is not transmitted, the error sensor 220 transmits graphic data, in which preset telephone number information of a manager and error generation information according to the notification message are included, to the subscriber application. The subscriber application transmits the graphic data to the digital TV for display through the DRM 245, thereby making it possible for the subscriber to recognize that a failure is generated on the digital broadcasting service, and to report to the manager that the failure is generated on the basis of the telephone number information (S190).

Meanwhile, the management server 110 finds out the types of errors according to code information on each error type which is included in the received notification message, and transmits a notification signal to the corresponding server or outputs an alarm signal so that the manager can recognize the error (S200).

The present invention can be realized as computer-executable instructions in computer-readable media. The computer-readable media includes all possible kinds of media in which computer-readable data is stored or included or can include any type of data that can be read by a computer or a processing unit. The computer-readable media include for example and not limited to storing media, such as magnetic storing media (e.g., ROMs, floppy disks, hard disk, and the like), optical reading media (e.g., CD-ROMs (compact disc-read-only memory), DVDs (digital versatile discs), re-writable versions of the optical discs, and the like), hybrid magnetic optical disks, organic disks, system memory (read-only memory, random access memory), non-volatile memory such as flash memory or any other volatile or non-volatile memory, other semiconductor media, electronic media, electromagnetic media, infrared, and other communication media such as carrier waves (e.g., transmission via the Internet or another computer). Communication media generally embodies computer-readable instructions, data structures, program modules or other data in a modulated signal such as the carrier waves or other transportable mechanism including any information delivery media. Computer-readable media such as communication media may include wireless media such as radio frequency, infrared microwaves, and wired media such as a wired network. Also, the computer-readable media can store and execute computer-readable codes that are distributed in computers connected via a network. The computer readable medium also includes cooperating or interconnected computer readable media that are in the processing system or are distributed among multiple processing systems that may be local or remote to the processing system. The present invention can include the computer-readable medium having stored thereon a data structure including a plurality of fields containing data representing the techniques of the present invention.

Figure 12:
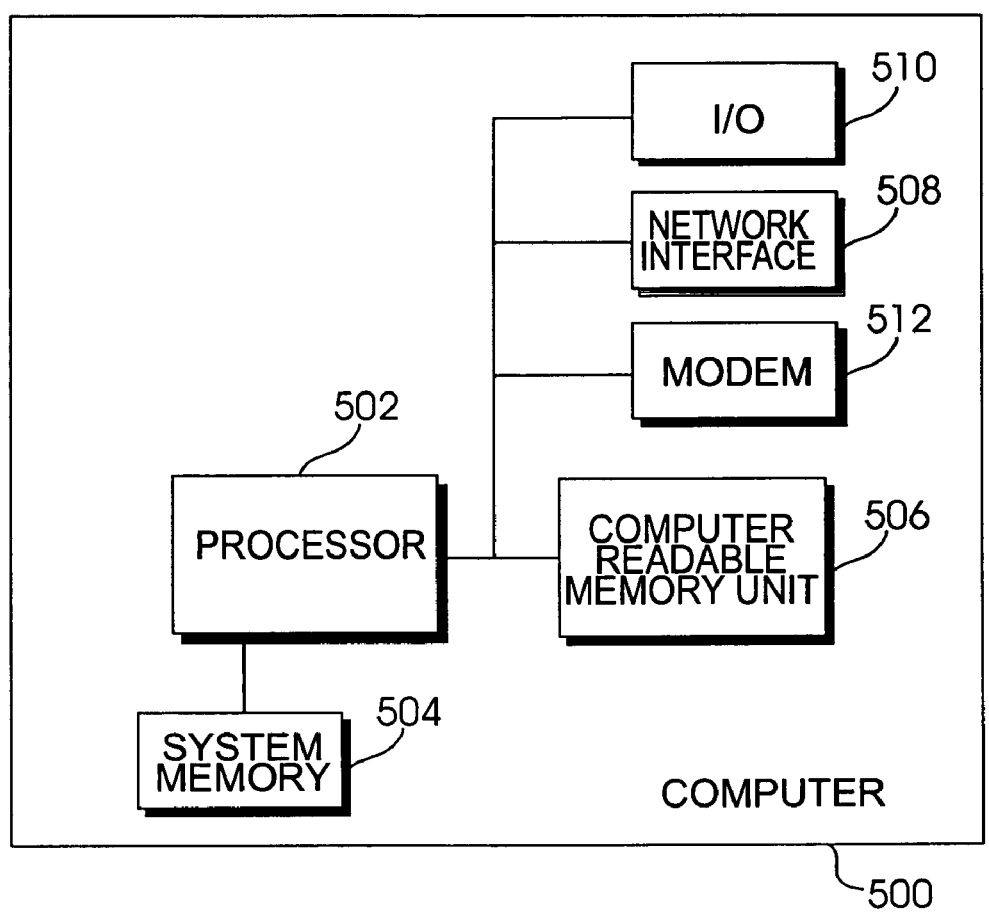
FIG. 12 shows an example of a computer including a computer-readable medium having computer-executable instructions for performing a technique of the present invention.

An example of a computer, but not limited to this example of the computer, that can read computer readable media that includes computer-executable instructions of the present invention is shown in FIG. 12. The computer 500 includes a processor 502 that controls the computer 500. The processor 502 uses the system memory 504 and a computer readable memory device 506 that includes certain computer readable recording media. A system bus connects the processor 502 to a network interface 508, modem 512 or other interface that accommodates a connection to another computer or network such as the Internet. The system bus may also include an input and output interface 510 that accommodates connection to a variety of other devices.

Although only the embodiment of the present invention has been described in detail, it will be apparent to those skilled in the art that various modifications, additions and substitutions are possible without departing from the scope and spirit of the invention. It is to be understood that the invention is not limited to the embodiments set forth herein for purposes of exemplification, but is to be limited only by the scope of the attached claim or claims.

As set forth above, according to the present invention, monitoring functions of the cable network, the broadcasting channel and received data are realized for the set-top box, as the digital broadcasting receiver, of the digital broadcasting system and notification messages caused by generated errors of the data are transmitted to the head end. Thereby, it is possible to efficiently manage the network and the head end in the digital broadcasting system.

What is claimed is:

1. A digital broadcasting system comprising:
   a service-providing server providing data for providing digital broadcasting services; and
   a digital broadcasting receiver monitoring a state of the data received through a network connected with said service-providing server;
   said digital broadcasting receiver generating a first notification message including intrinsic information on a generated error when said data received from said service-providing server have a received power level beyond a predetermined range;
   said digital broadcasting receiver generating a second notification message including intrinsic information on a generated error when a value of signal to noise ratio exceeds a predetermined value;
   said digital broadcasting receiver generating a third notification message including intrinsic information on a generated error when the data are not received from the service-providing server at a predetermined cycle time;

said digital broadcasting receiver transmitting the generated notification messages to said service-providing server, wherein the service-providing server generates and outputs an alarm message according to the intrinsic information on each error included in the notification messages received from said digital broadcasting receiver.

2. The digital broadcasting system according to claim 1, wherein said service-providing server comprises:
   a first server providing service data including program information and event information provided to said digital broadcasting system;
   a second server encoding, compressing and providing broadcasting data including video data and audio data;
   a third server providing conditional access data including key information capable of decoding the encoded broadcasting data and information on authority of a subscriber to watch each program; and
   a fourth server outputting the alarm message according to the intrinsic information on each error included in the notification messages received from said digital broadcasting receiver.

3. The digital broadcasting system according to claim 2, wherein said fourth server generates a notification signal according to the intrinsic information included in the notification messages and transmits the generated notification signal to a corresponding server.

4. The digital broadcasting system according to claim 2, further comprising a cable modem termination system converting data of an Internet protocol packet format received through an Internet protocol network into data packets capable of being transmitted through a cable network, and converting the notification messages into data of the Internet protocol packet format capable of being transmitted to the fourth server.

5. The digital broadcasting system according to claim 4, wherein said digital broadcasting receiver comprises:
   a cable modem receiving the data converted at said cable modem termination system and transmitting the generated notification messages to said fourth server through said cable modem termination system;
   a service information processor storing the service data transmitted from said first server and generating a service data report signal, and when the conditional access data are received from said third server, generating a first conditional access data report signal;
   a data processor decompressing the broadcasting data transmitted from said second server, converting the decompressed broadcasting data into broadcasting signals and generating a broadcasting data report signal, and when the conditional access data are received from said third server, generating a second conditional access data report signal; and
   an error sensor monitoring at least one of a generation state of each generated report signal and a reception state of the data received through the network, generating the notification messages including the intrinsic information according to the generated errors, and transmitting the generated notification messages to said fourth server.

6. The digital broadcasting system according to claim 5, wherein said data processor comprises a sniffer for generating said second conditional access data report signal when the conditional access data of an entitle control message format is sniffed from said third server and transmitting the generated second conditional access data report signal to said error sensor.

7. The digital broadcasting system according to claim 5, wherein said data processor decompresses the broadcasting data received from said second server according to a certain coding scheme including a moving picture experts group coding scheme and transmits the broadcasting data report signal to said error sensor.

8. The digital broadcasting system according to claim 5, wherein said error sensor comprises:
   a sensing information setter setting intrinsic information on each type of the errors generated in said digital broadcasting system;
   a sub-sensor finding out information on types of the errors according to a generation state of each report signal and a reception state of the data received through the network, and generating the notification messages including the intrinsic information according to the error; and
   a message transmitter transmitting the notification messages generated at said sub-sensor to said fourth server through said cable modem.

9. The digital broadcasting system according to claim 8, wherein the sub-sensor includes:
   a network sub-sensor generating a network notification message when the data received from each server have either a received power level beyond a predetermined range or a value of signal to noise ratio exceeding a predetermined value;
   a service data sub-sensor generating a service data notification message when the service data report signal is not received from the service information processor at a predetermined cycle time;
   a conditional access data sub-sensor generating a conditional access data notification message when any one of the first conditional access data report signal received from said service information processor and the second conditional access data report signal received from a sniffer is not received at a predetermined cycle time; and
   a broadcasting data sub-sensor generating a broadcasting data notification message when the broadcasting data report signal is not received from the data processor by a predetermined number of times within a predetermined time.

10. The digital broadcasting system according to claim 9, wherein the error sensor further comprises a sensing controller preventing each data notification message from being generated for a predetermined time when a network notification message is generated at said network sub-sensor.

11. The digital broadcasting system according to claim 8, wherein said sensing information setter sets at least one of address information of said fourth server, telephone number information, intrinsic information of the corresponding digital broadcasting receiver, transmission cycle time information of the notification messages, and intrinsic information on each error.

12. The digital broadcasting system according to claim 8, wherein the error sensor generates the notification messages including at least one of intrinsic information of the digital broadcasting receiver, intrinsic information on each error and additional information according to the errors on the basis of transmission cycle time information.

13. The digital broadcasting system according to claim 8, wherein said error sensor transmits graphic data including failure information corresponding to set telephone number information and the intrinsic information on each error to said data processor when the generated notification messages are not transmitted to said fourth server.

14. The digital broadcasting system according to claim 13, wherein said data processor refreshes graphic signals according to the graphic data to be added to the broadcasting signals according to the broadcasting data when the graphic data are received from said error sensor, and accommodates a subscriber to recognize the telephone number information and the failure information.

15. A digital broadcasting receiver of a digital broadcasting system including a service information server, a conditional access server, a digital broadcasting server and a management server, the digital broadcasting receiver comprising:
   a service information processor generating a service data report signal when service data including program information transmitted from said service information server are received, and generating an entitle management message conditional access data report signal when conditional access data are received from the conditional access server in an entitle management message format;
   a data processor generating a broadcasting data report signal when broadcasting data are received from the digital broadcasting server, and generating an entitle control message conditional access data report signal when the conditional access data are received from the conditional access server in an entitle control message format; and
   an error sensor monitoring errors of each server and an error of a network according to a generation state of each report signal, generating notification messages including intrinsic information on each error when said data received from said information server have a received power level beyond a predetermined range, a value of signal to noise ratio exceeds a predetermined value, said service data report signal is not received at a predetermined cycle time or said broadcasting data report signal is not received at a predetermined cycle time, and transmitting the generated notification messages to said management server.

16. The digital broadcasting receiver according to claim 15, wherein said data processor comprises:
   a decoder decompressing the broadcasting data transmitted from said digital broadcasting server according to a certain coding scheme including moving picture experts group coding scheme and generating the broadcasting data report signal; and
   a sniffer sniffing the conditional access data transmitted from said conditional access server in the entitle control message format and generating the entitle control message conditional access data report signal.

17. The digital broadcasting receiver according to claim 15, wherein said error sensor includes at least one of:
   a network sub-sensor generating a network notification message when the respective data received through the network have either a received power level beyond a predetermined range or a value of signal to noise ratio exceeding a predetermined value;
   a service data sub-sensor generating a service data notification message when the service data report signal is not received from the service information processor at a predetermined cycle of time;
   a broadcasting data sub-sensor generating a broadcasting data notification message when the broadcasting data report signal is not received from the decoder by a predetermined number of times within a predetermined time; and
   a conditional access data sub-sensor generating a conditional access data notification message when any one of the entitle management message conditional access data report signal generated at said service information processor and the entitle control message conditional access data report signal generated at a sniffer is not received at a predetermined cycle of time.

18. The digital broadcasting receiver according to claim 17, further comprising:
   a sensing controller interrupting monitoring functions of each data sub-sensor for a predetermined time when the network notification message is generated at said network sub-sensor; and
   a message transmitter transmitting each notification message to said management server through the network.

19. The digital broadcasting receiver according to claim 15, further comprising:
   a subscriber application providing graphic data according to program information based on the service data by a request of a subscriber; and
   a display refresher refreshing image signals according to the graphic data provided at said subscriber application to be included in broadcasting signals according to the broadcasting data.

20. A method of managing a reception state of data in a digital broadcasting system, comprising:
   setting sensing information including intrinsic information on each error;
   monitoring the reception state of the data transmitted from a service-providing server according to a received power level, a value of signal to noise ratio and a cycle time of receiving the data from the service-providing server;
   finding out types of the errors according to the data reception state, generating notification messages including the intrinsic information on each error, and transmitting the generated notification messages to said service-providing server; and
   outputting, at said service-providing server, alarm messages according to the notification messages accommodating a manager recognizing the notification messages, wherein generating the notification messages comprises:
      generating a network notification message when the data have either a received power level beyond a predetermined range or have a value of signal to noise ratio exceeding a predetermined value:
      generating a broadcasting data notification message when broadcasting data are not received by a predetermined number of frames for a predetermined time;
      generating a service data notification message when service data are not received at a predetermined cycle time; and
      generating a conditional access data notification message when conditional access data are not received at a predetermined cycle of time.

21. The method according to claim 20, wherein the sensing information includes at least one of address information of a management server corresponding to a destination of the notification messages, telephone number information, intrinsic information of a corresponding area, transmission cycle time information of the notification message, and intrinsic information on each error.

22. The method according to claim 20, wherein monitoring the reception state of the data includes at least one of:
   checking whether or not the data received through a network have either a received power level beyond a predetermined range or a value of signal to noise ratio exceeding a predetermined value;
   determining whether or not broadcasting data received through the network are received by a predetermined number of frames for a predetermined time;

determining whether or not service data including program information are received at a predetermined cycle of time; and determining whether or not conditional access data including key information and information on authority of a subscriber to watch each program are periodically received.

23. The method according to claim 20, wherein generating the notification messages further includes interrupting monitoring functions accommodating a prevention of the notification messages of the respective data from being generated for a predetermined time when the network notification message is generated.

24. The method according to claim 20, further comprising:

determining whether or not the notification messages are transmitted to a management server and, when the notification messages are not transmitted to said management server, generating graphic data including set telephone number information and failure information corresponding to the intrinsic information on each error; and refreshing image signals according to the graphic data to be added to broadcasting signals according to broadcasting data transmitted from said service-providing server.

25. The method according to claim 20, further comprising:

storing program information included in service data and displaying the program information by request of a subscriber;

checking whether or not the subscriber has authority to watch corresponding program information and, when the subscriber has authority to watch corresponding program information, decoding encoded broadcasting data according to key information included in conditional access data; and decompressing the decoded broadcasting data according to a moving picture experts group coding scheme and transmitting broadcasting signals to a digital television.

26. A method of managing a reception state of data at a digital broadcasting receiver of a digital broadcasting system having a management server, the method comprising:

setting sensing information including intrinsic information on each error, intrinsic information of said management server and telephone number information of a manager;

generating a network notification message including intrinsic information, when said data received from said information server have either a received power level beyond a predetermined range or a value of signal to noise ratio exceeding a predetermined value;

generating data report signals according to the data received through the network;

generating data notification messages including intrinsic information, when said data report signals are not received at a predetermined cycle time, and preventing each data notification message from being generated for a predetermined time when the network message is generated;

transmitting the generated data notification messages to said management server according to the intrinsic information of the management server; and displaying failure information corresponding to the telephone number information and the intrinsic information on each error when the data notification messages are not transmitted to said management server.

27. The method according to claim 26, wherein generating the data report signals includes at least one of:

decompressing broadcasting data received from a digital broadcasting server to generate a broadcasting data report signal;

storing service data received from a service information server to generate a service data report signal; and generating a conditional access report signal according to conditional access data received from a conditional access server in any one of an entitle management message format and an entitle control message format.

28. The method according to claim 27, wherein generating the data notification messages includes at least one of:

generating a broadcasting data notification message when the broadcasting data report signal is not received by a predetermined number of times within a predetermined time;

generating a service data notification message when the service data report signal is not received at a predetermined cycle of time; and generating a conditional access data notification message when the conditional access data report signal is not received at a predetermined cycle of time.

* * * * *